Figure 18:
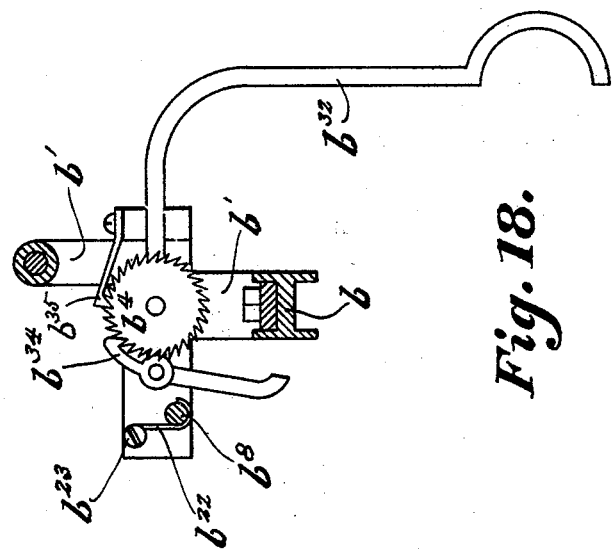

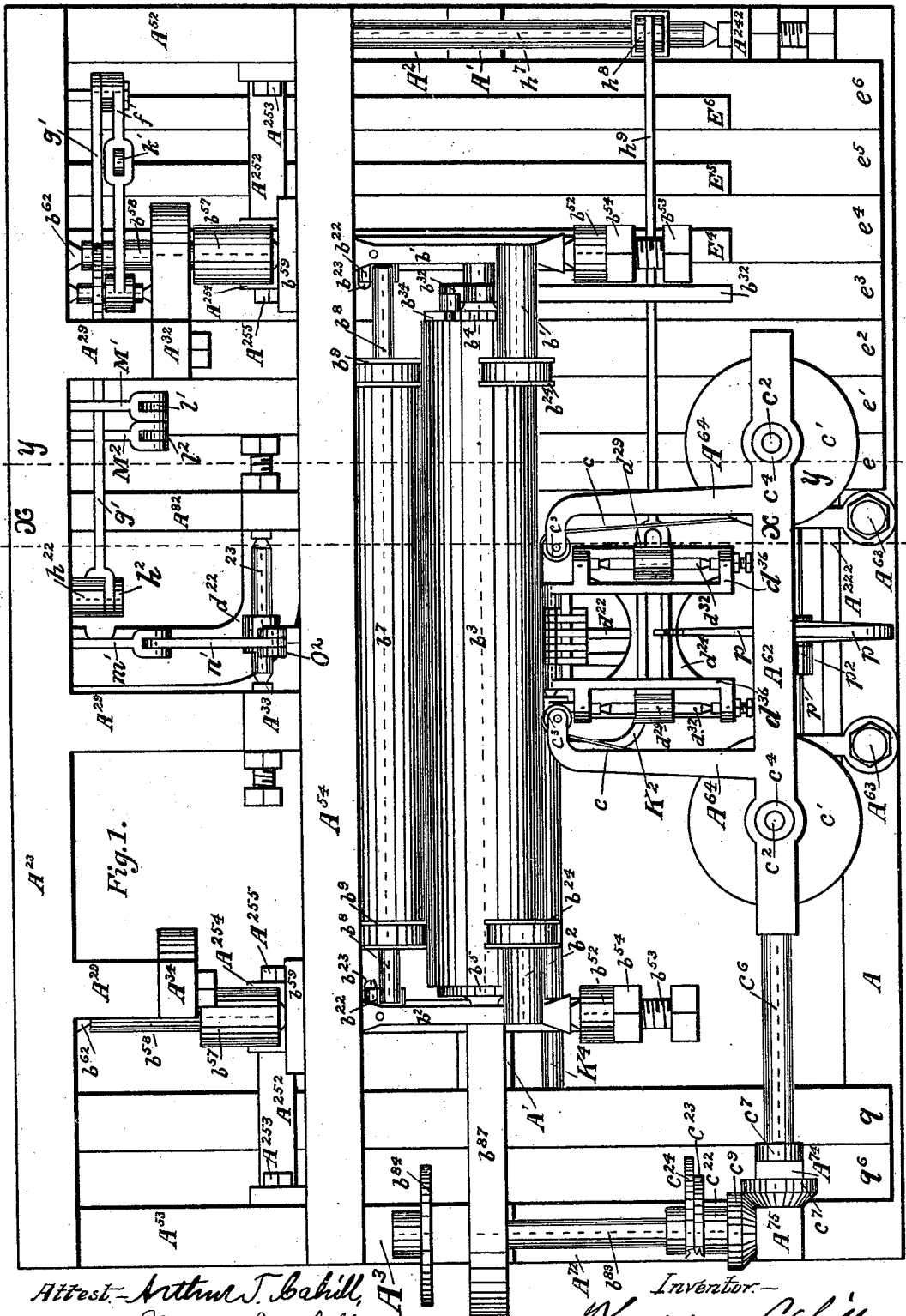

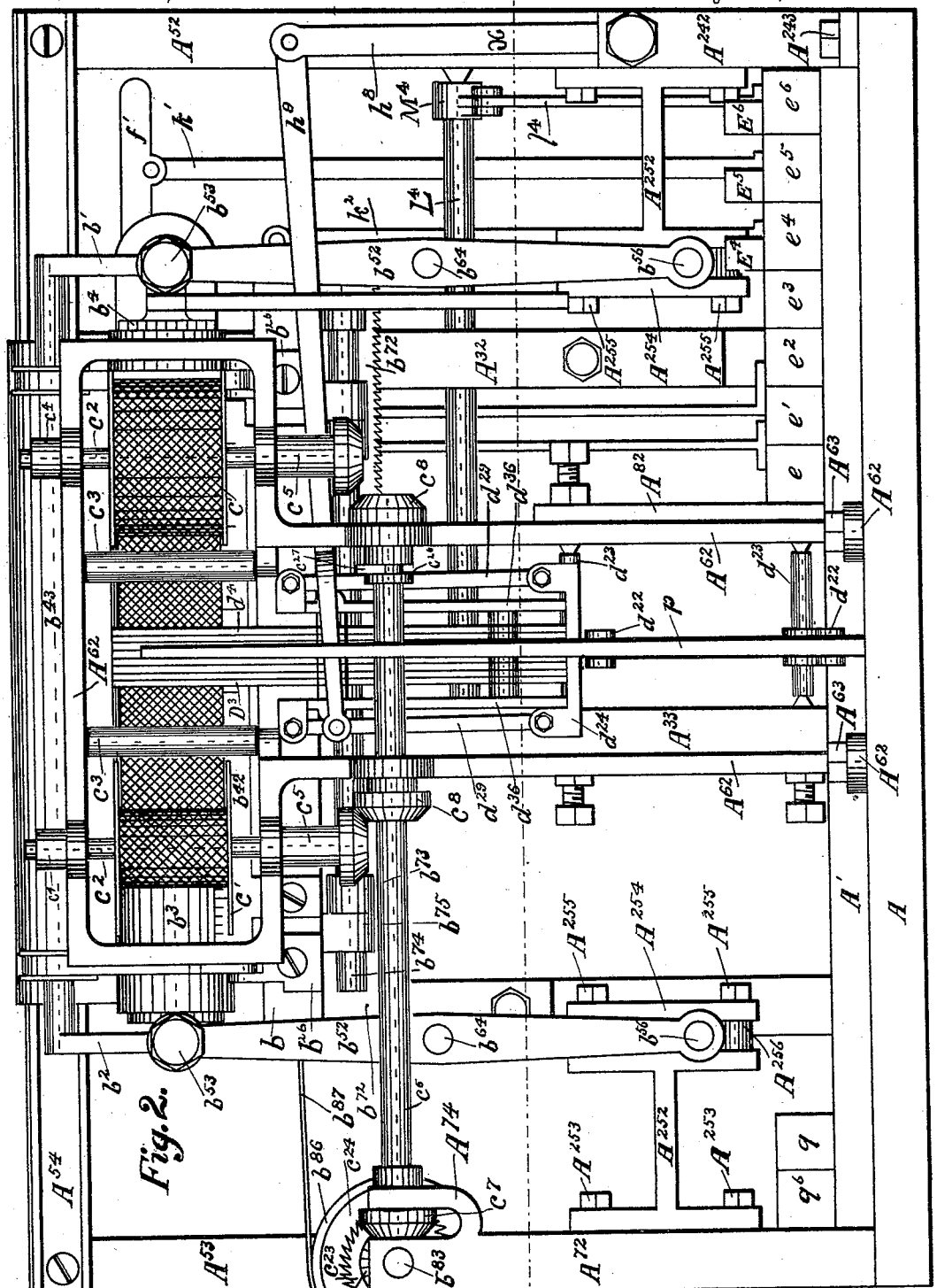

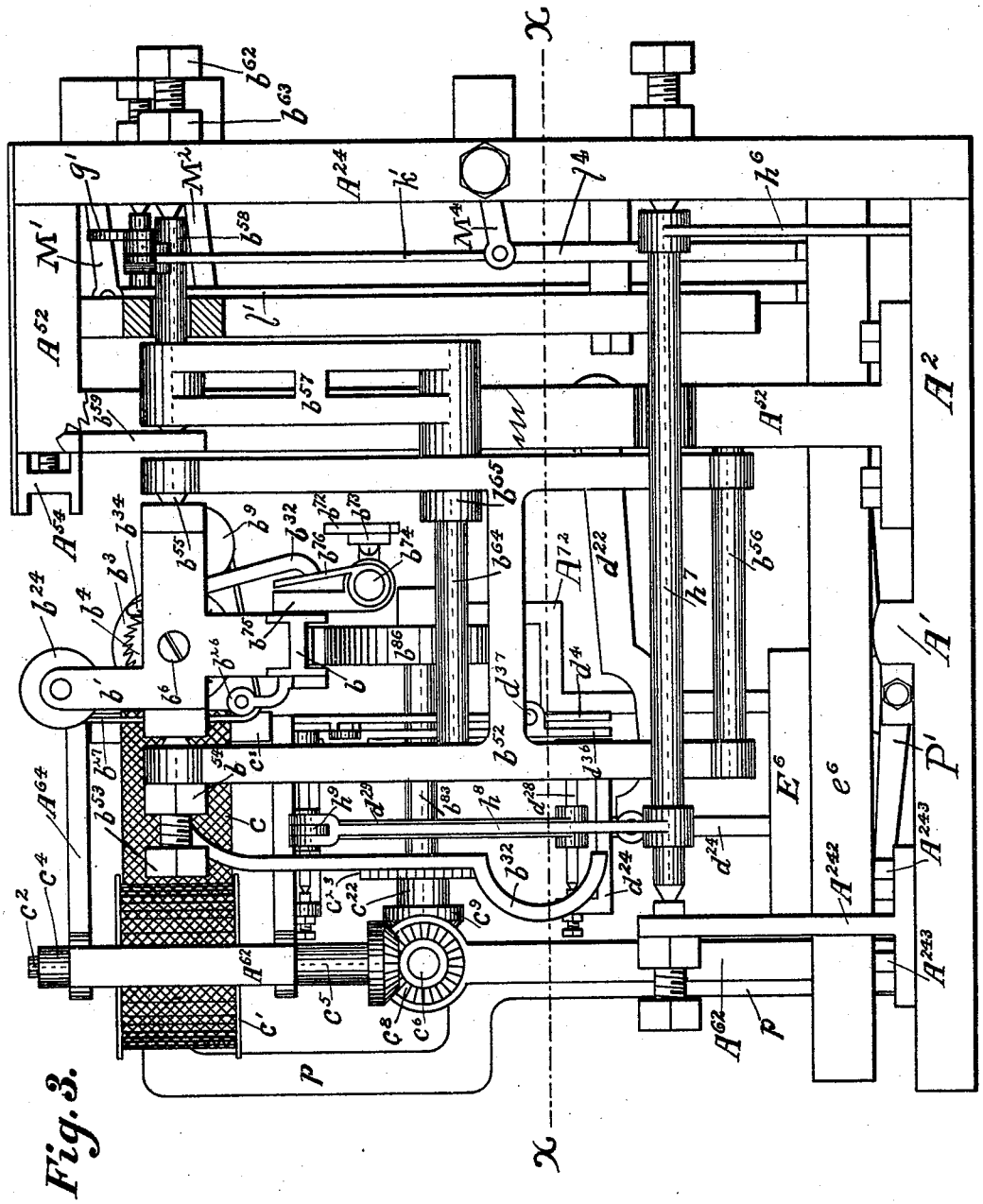

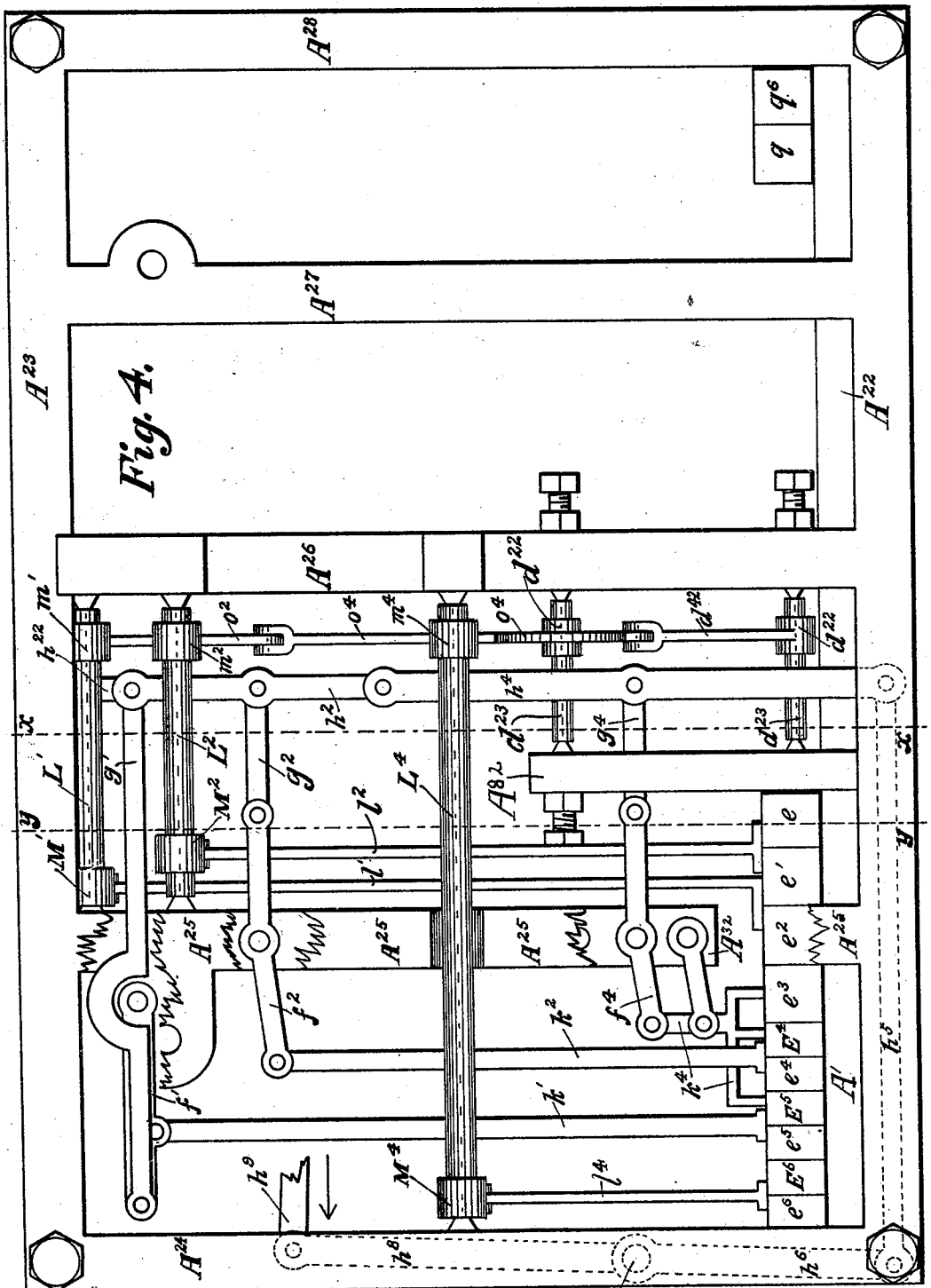

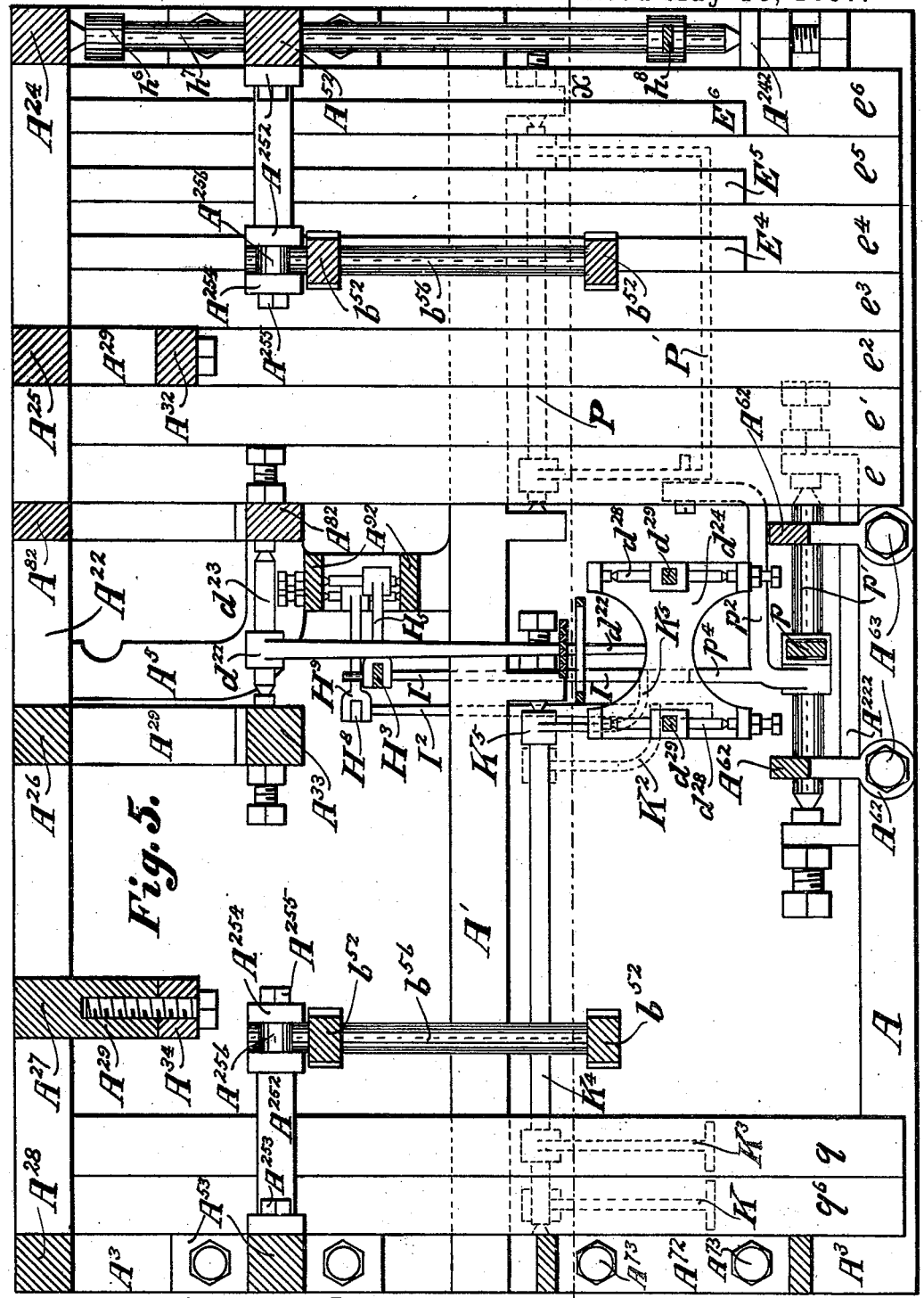

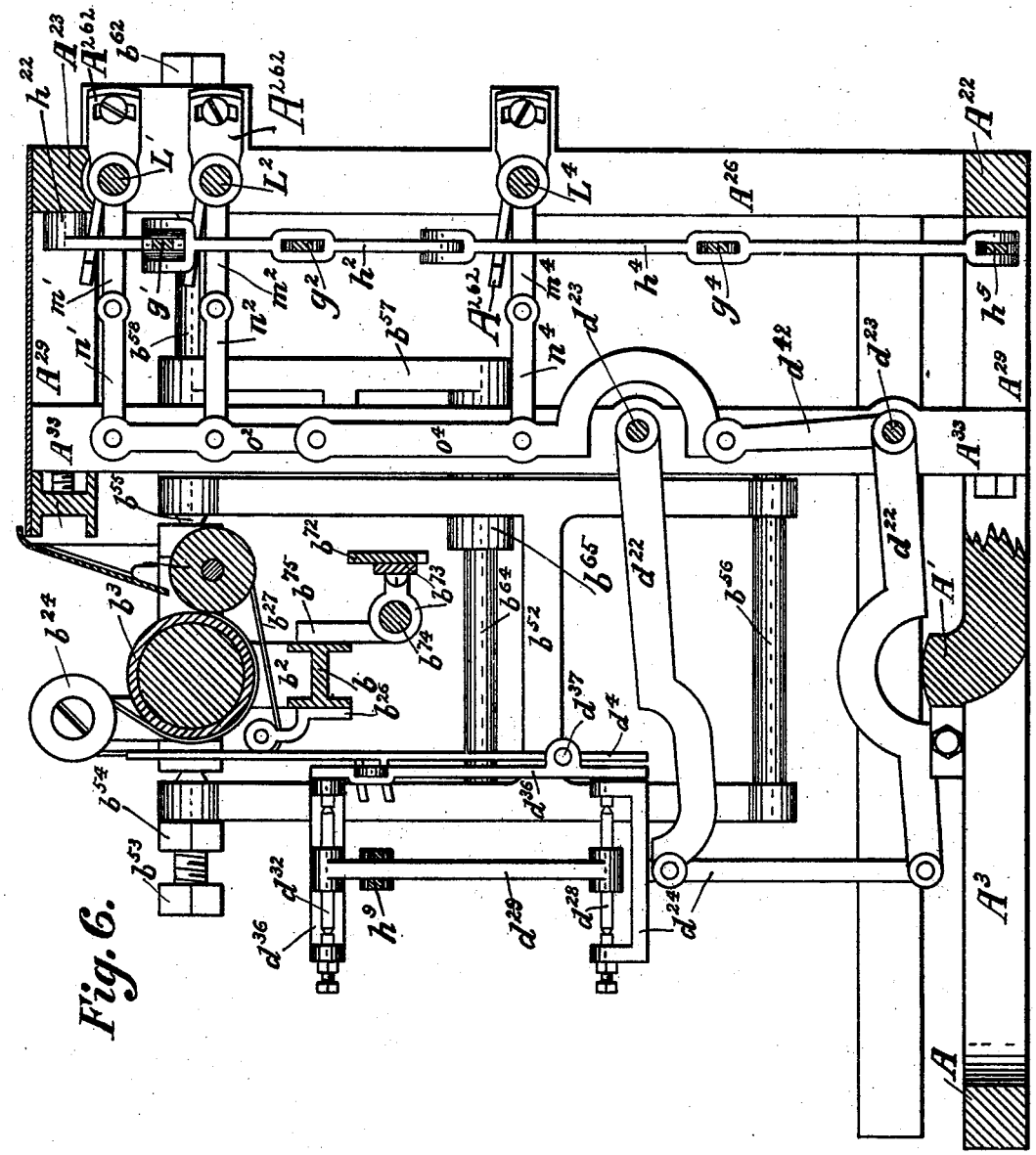

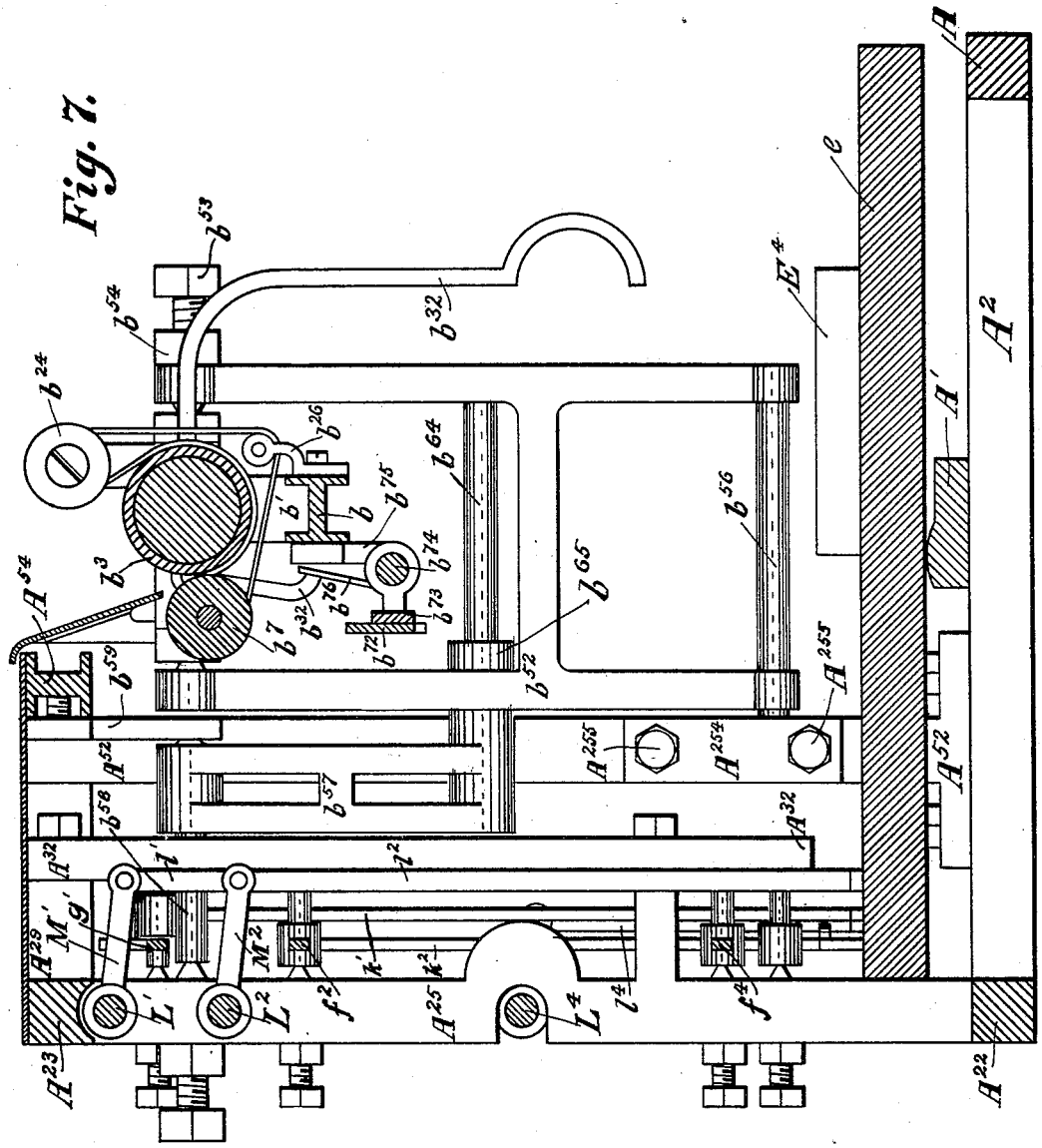

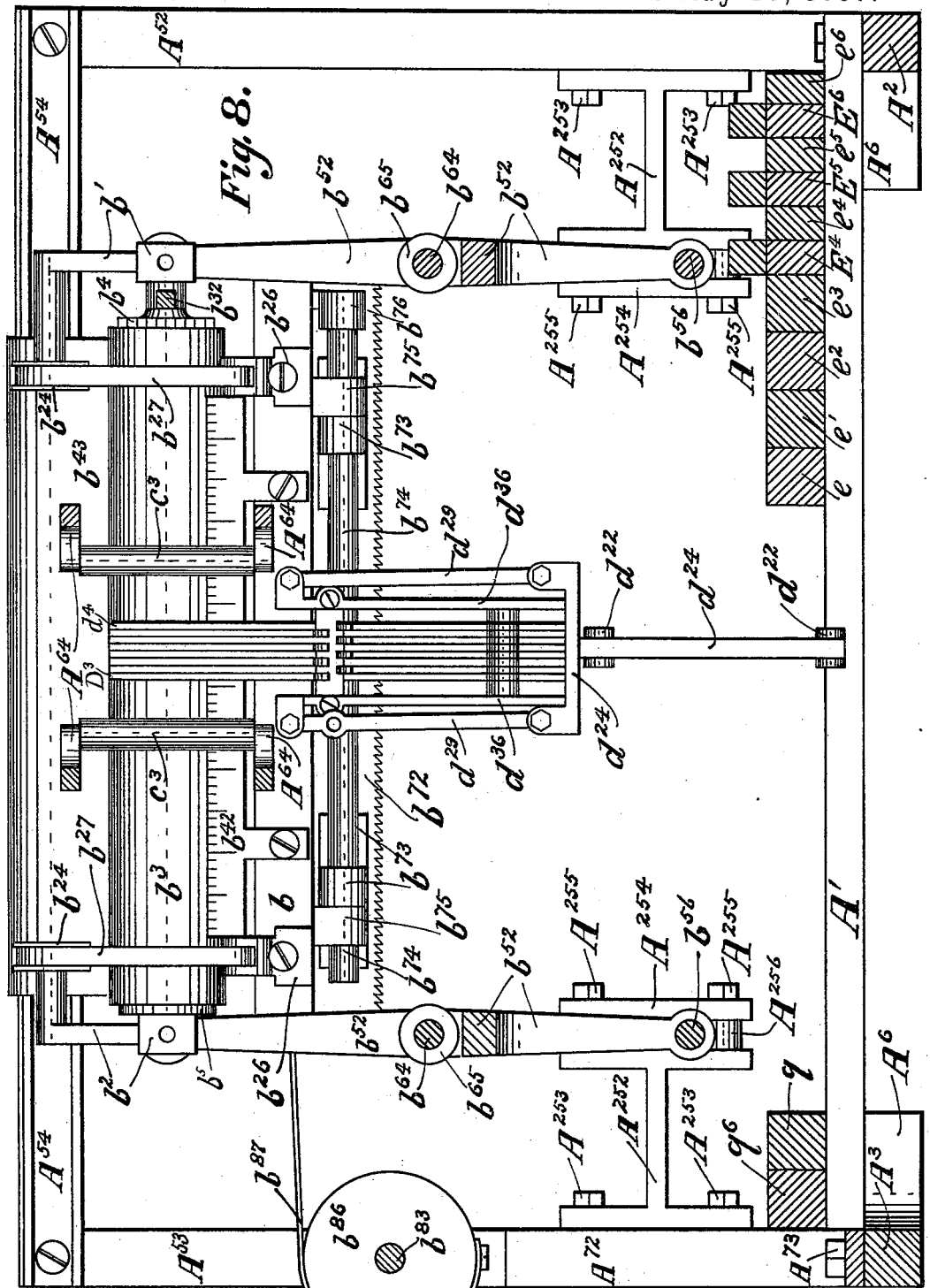

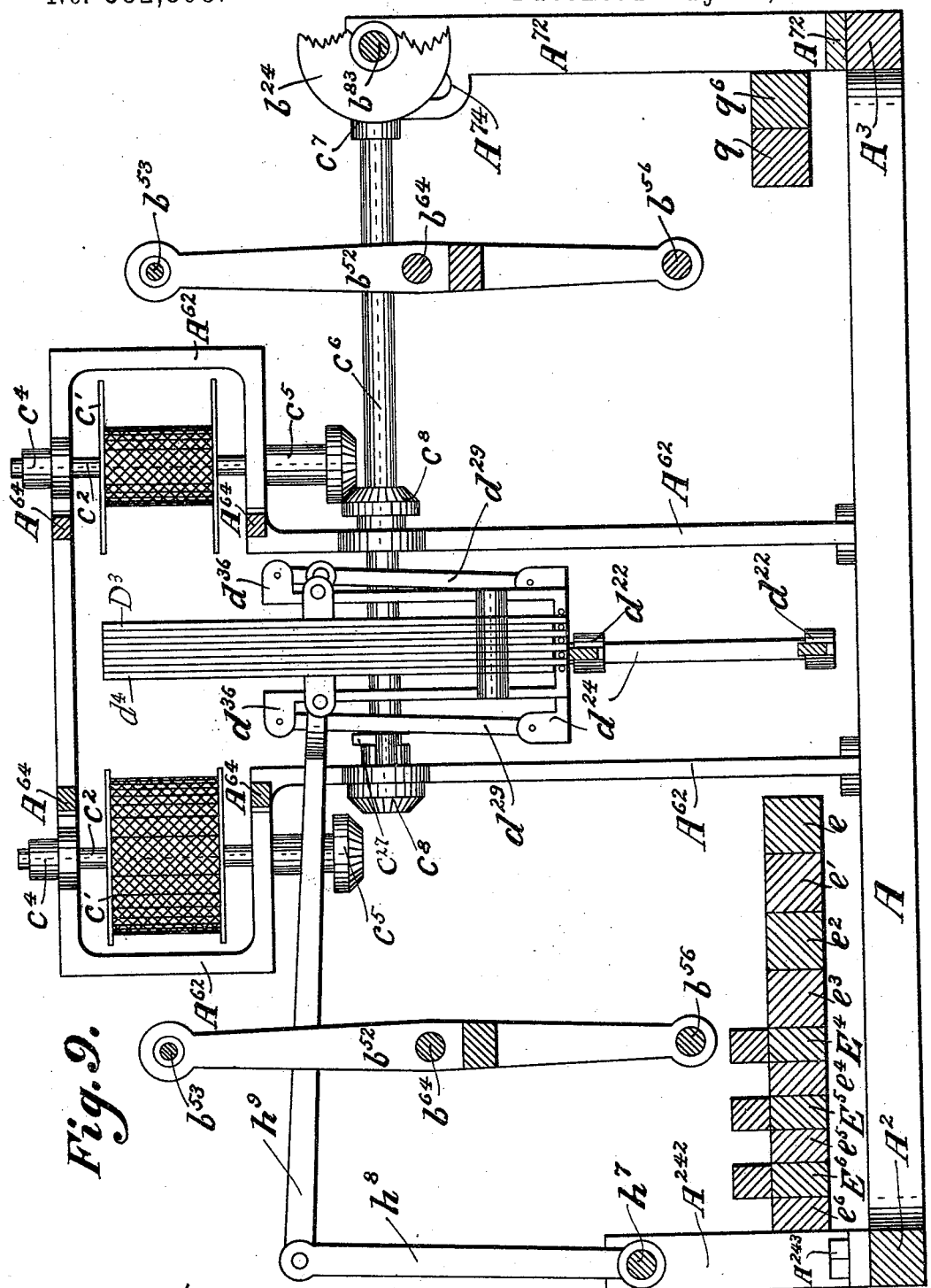

(No Model.)
T. CAHILL.
TYPE WRITING MACHINE.
No. 582,898. Patented May 18, 1897.
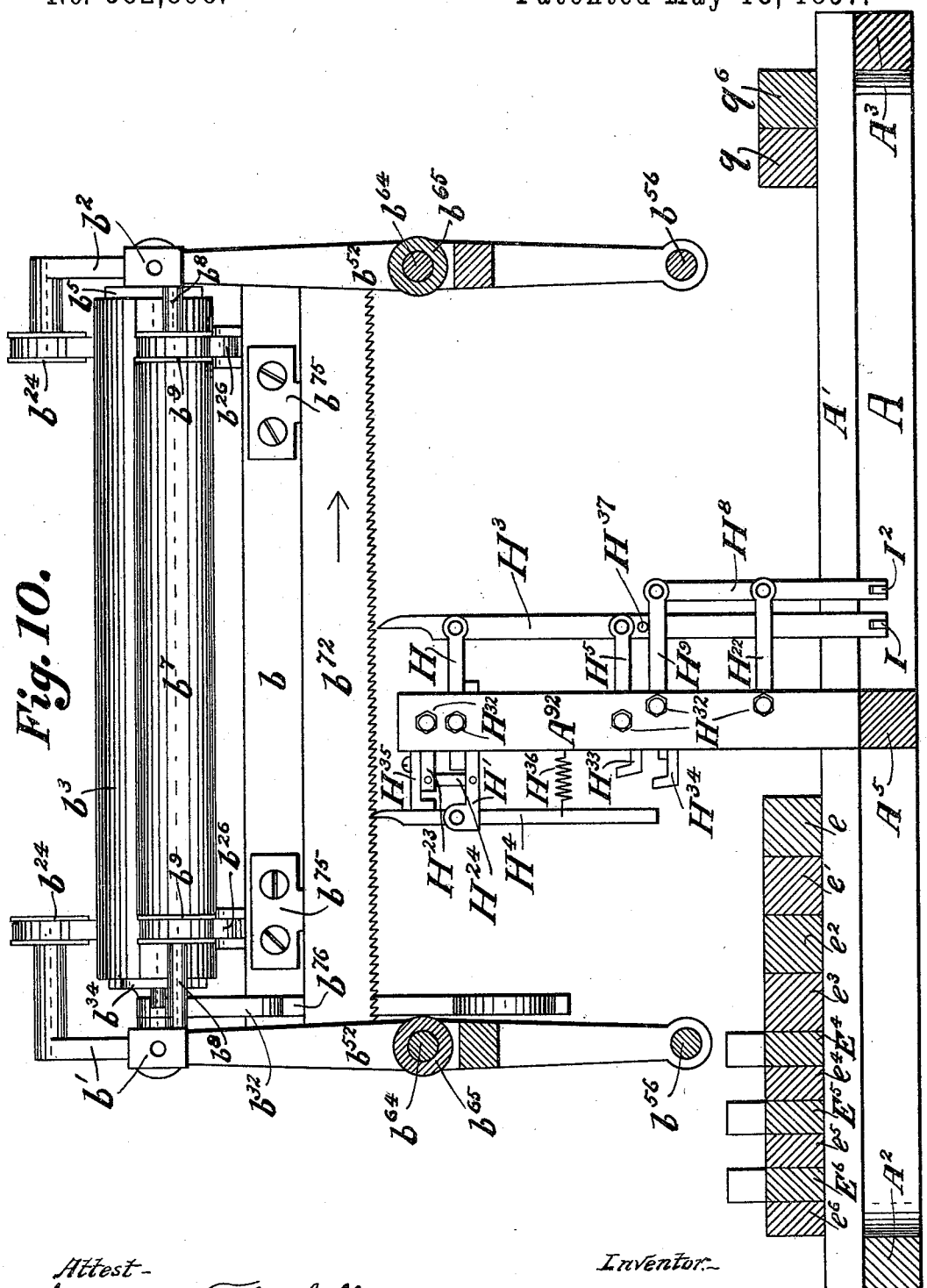
Attest-
Arthur T. Cahill,
M. H. Cahill
Inventor-
Thaddeus Cahill.

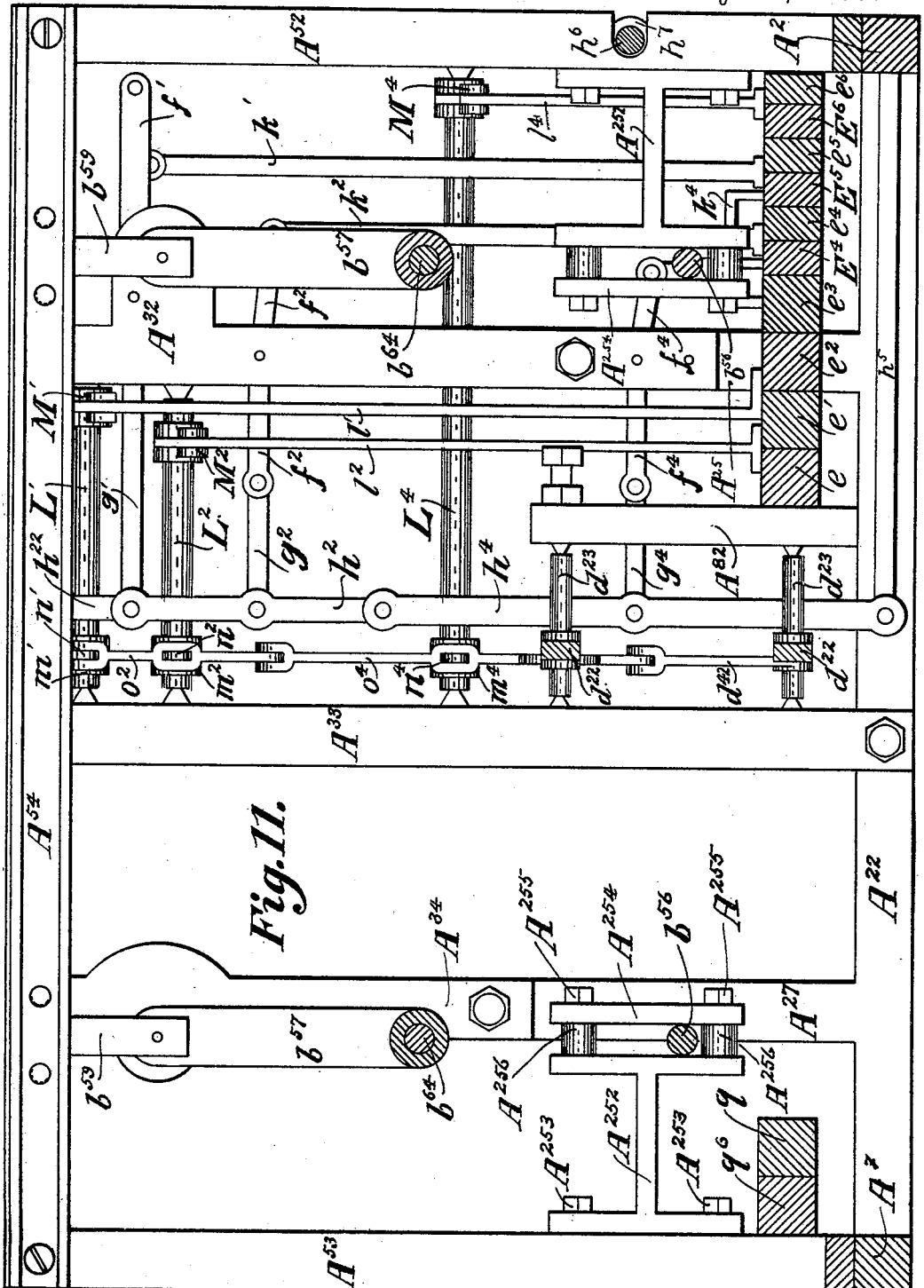

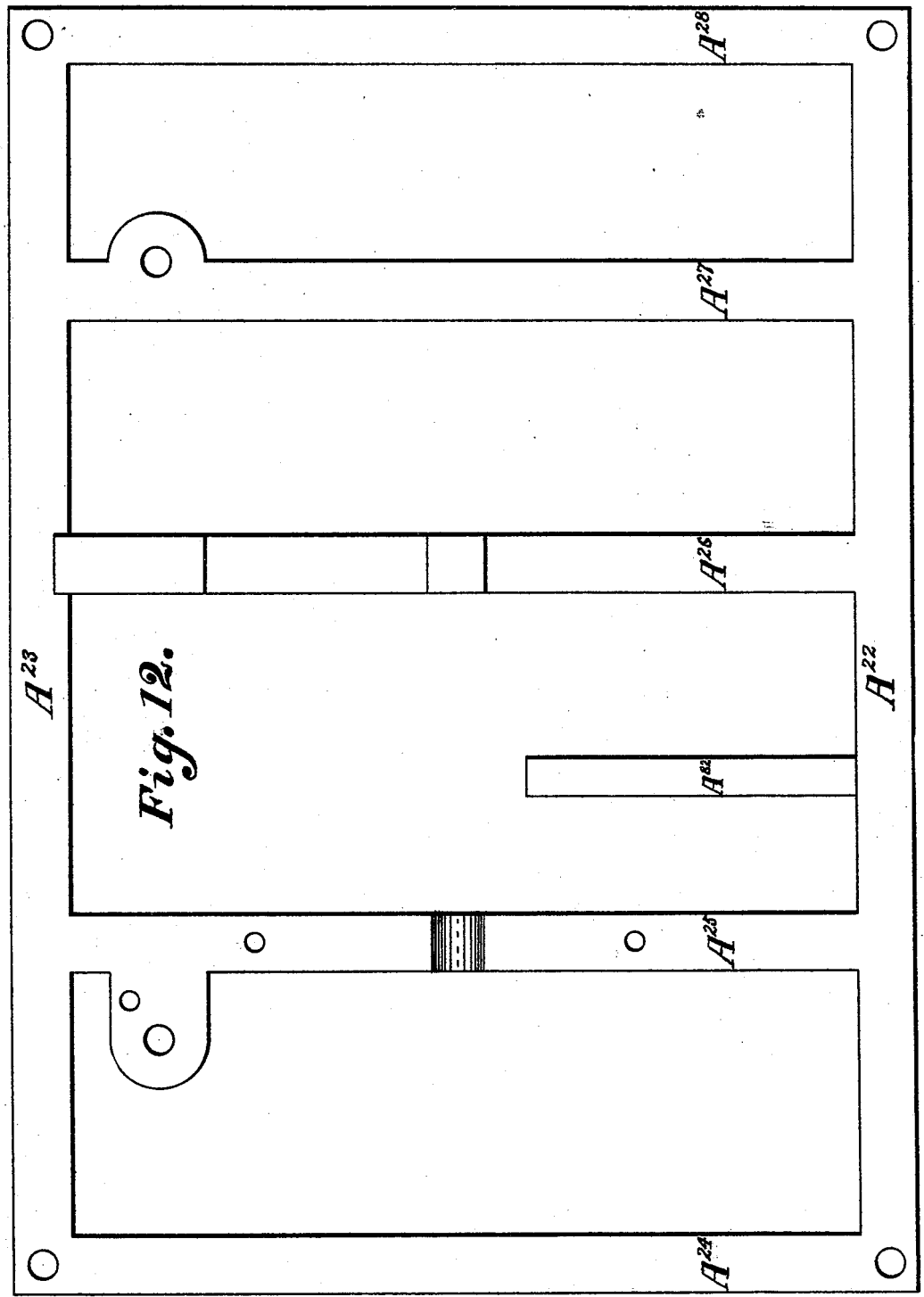

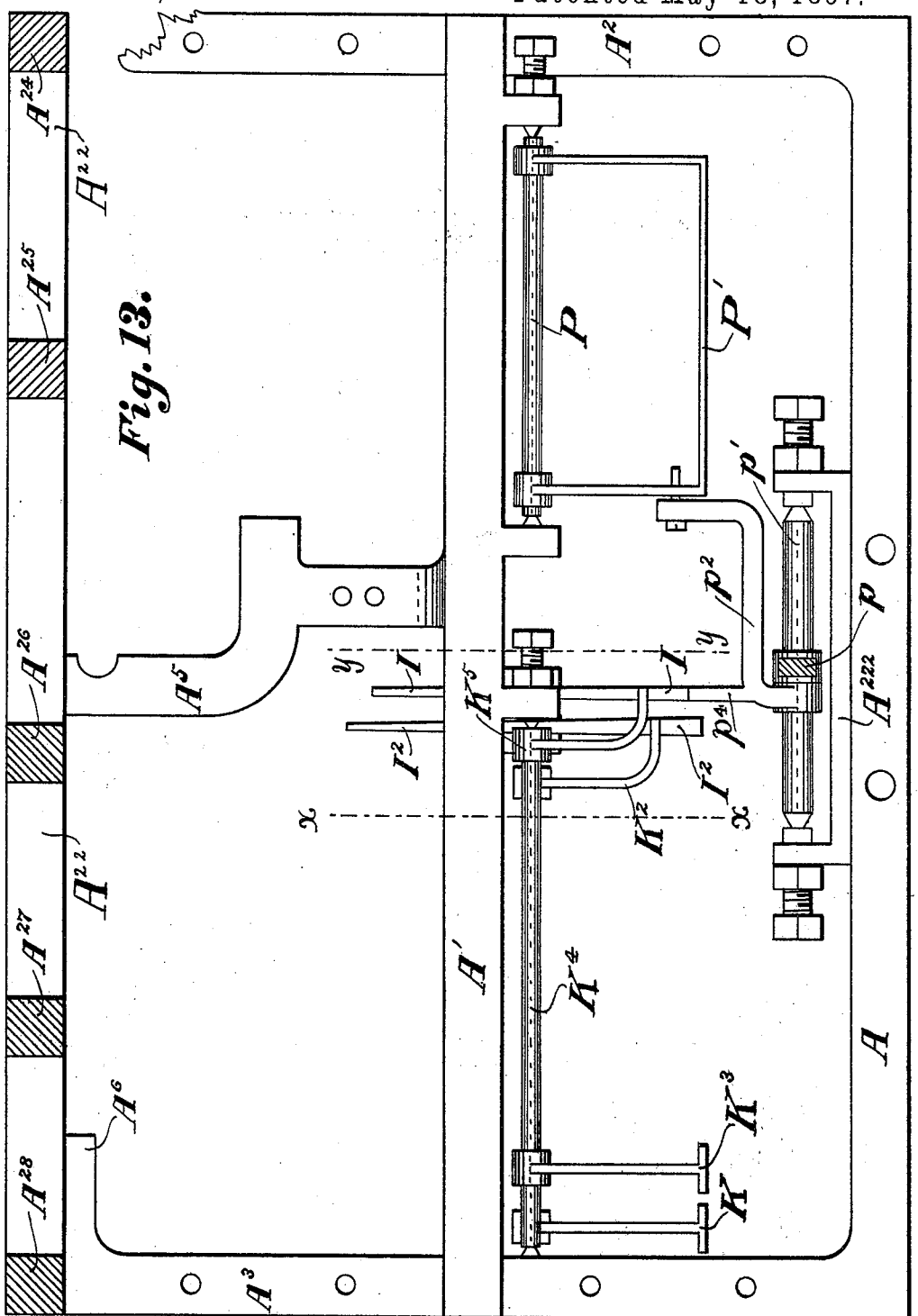

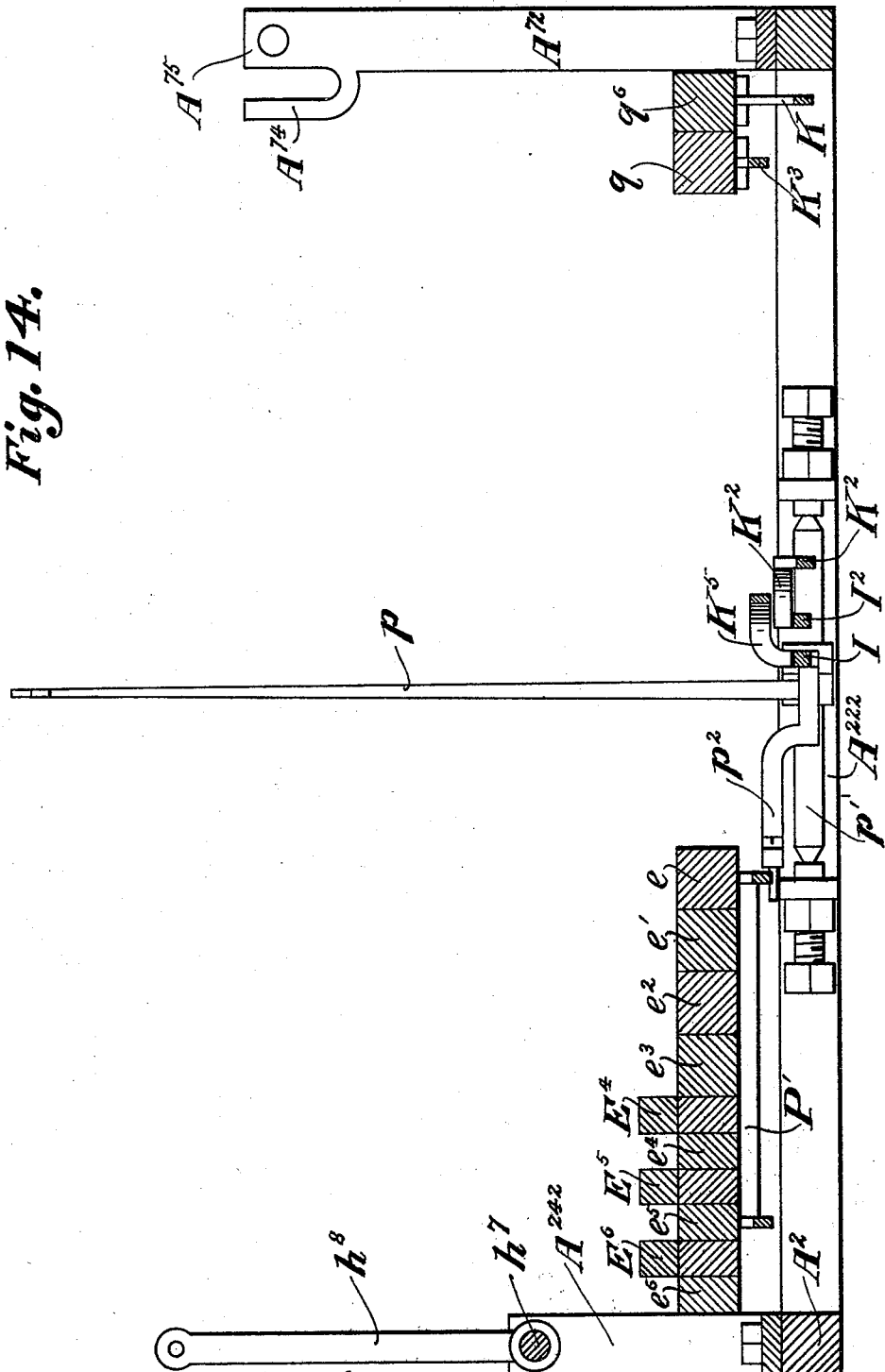

(No Model.)  21 Sheets—Sheet 15.
T. CAHILL.
TYPE WRITING MACHINE.
No. 582,898. Patented May 18, 1897.
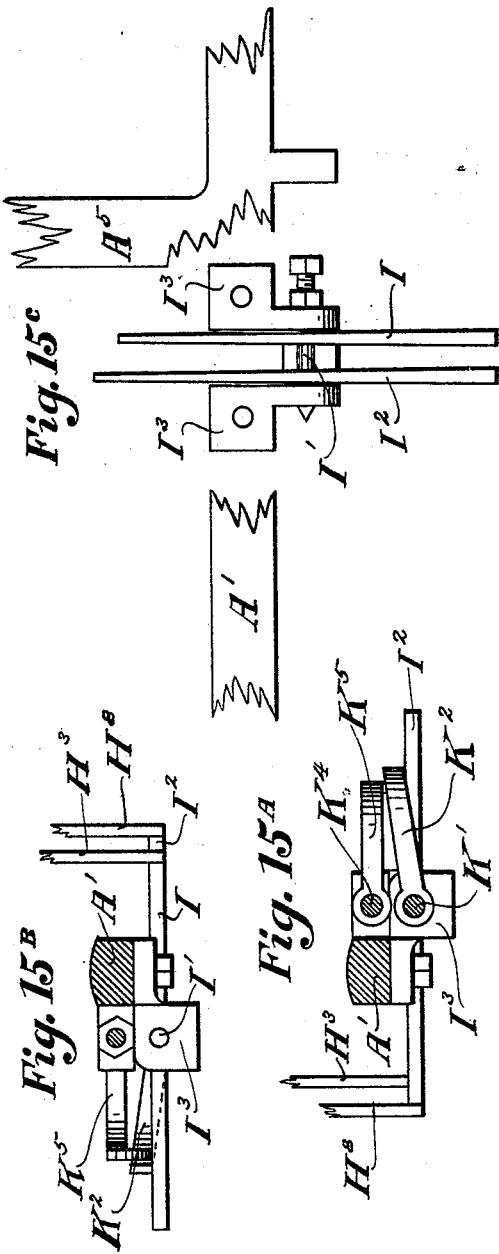
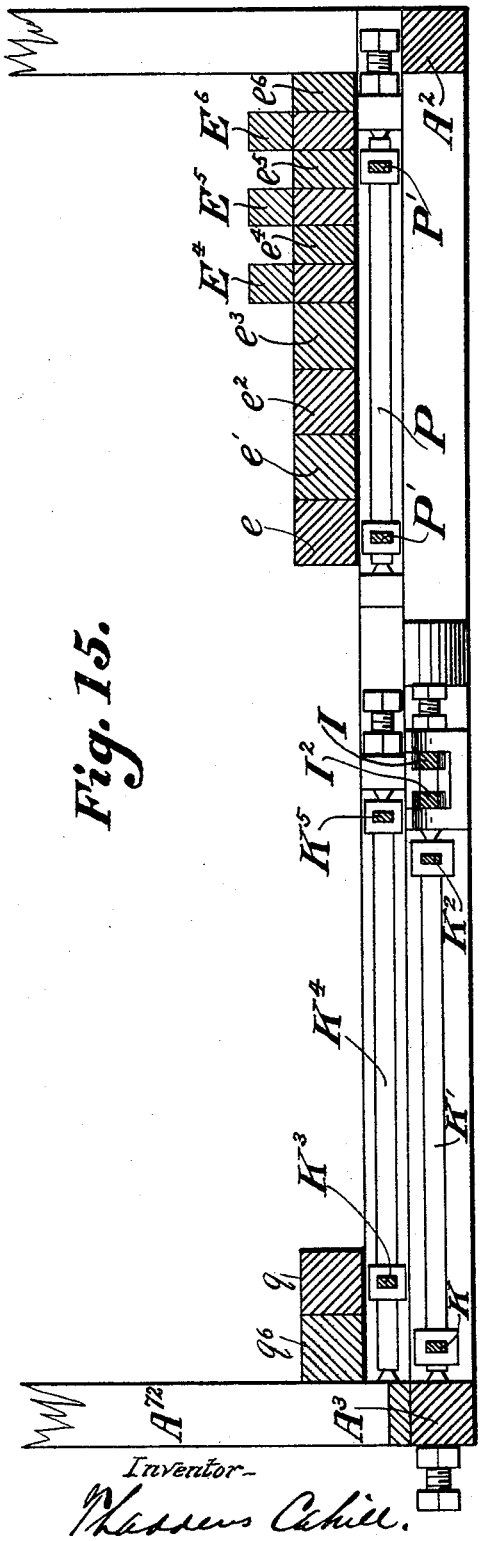
Attest Arthur T. Cahill,
M. H. Cahill.
Inventor—
Thaddeus Cahill.

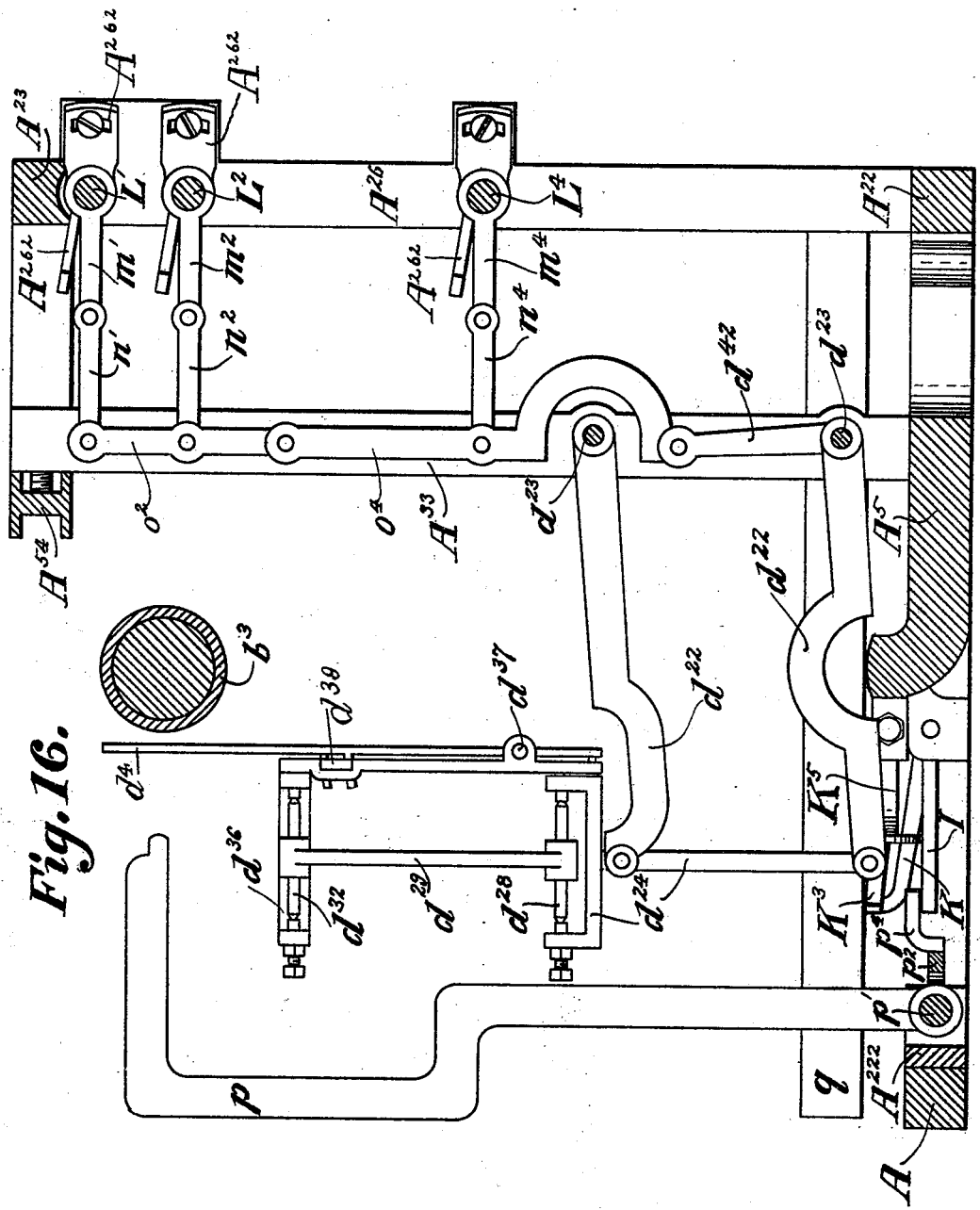

(No Model.)  21 Sheets—Sheet 17.

T. CAHILL.
TYPE WRITING MACHINE.

No. 582,898. Patented May 18, 1897.

Attest—
Arthur T. Cahill,
M. H. Cahill

Inventor—
Thaddeus Cahill

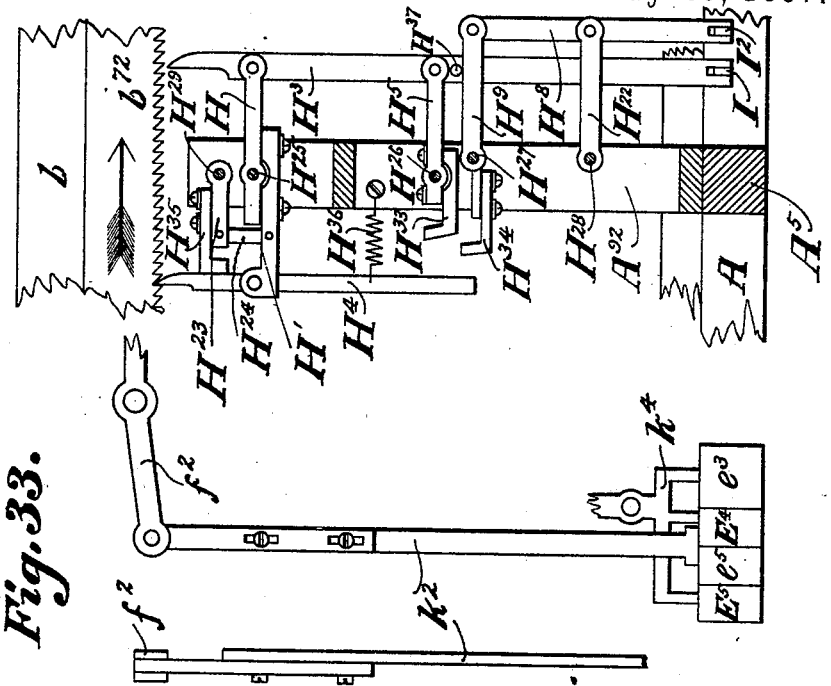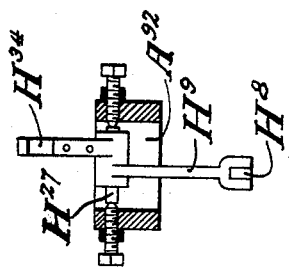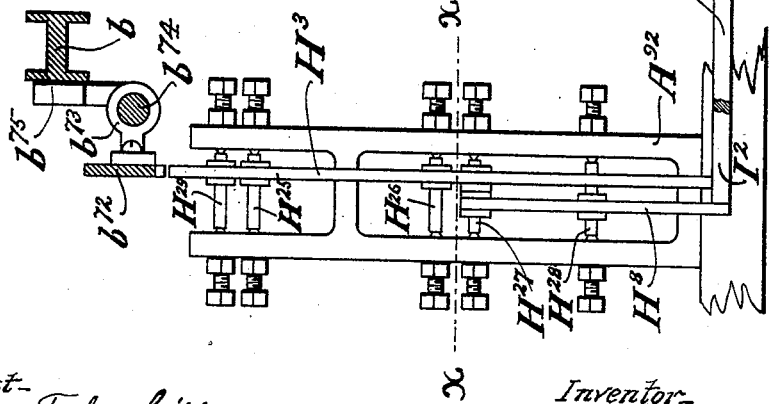

(No Model.) 21 Sheets—Sheet 19.
T. CAHILL.
TYPE WRITING MACHINE.
No. 582,898. Patented May 18, 1897.
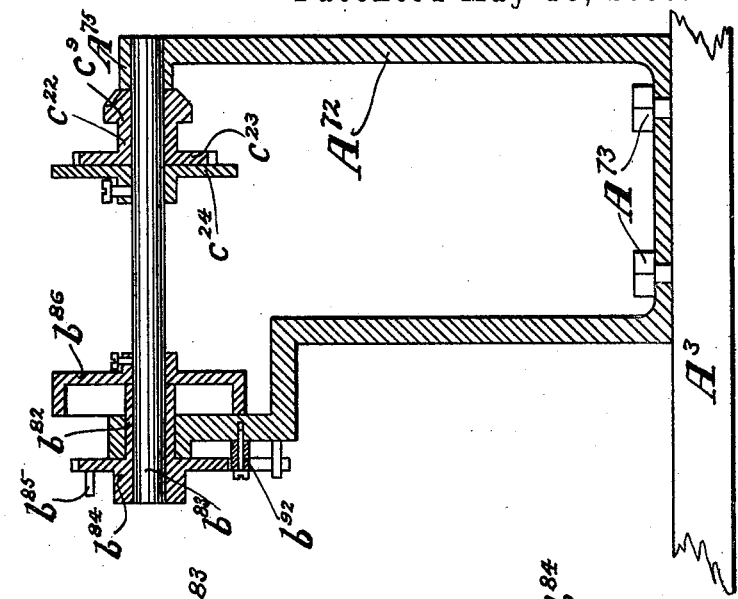
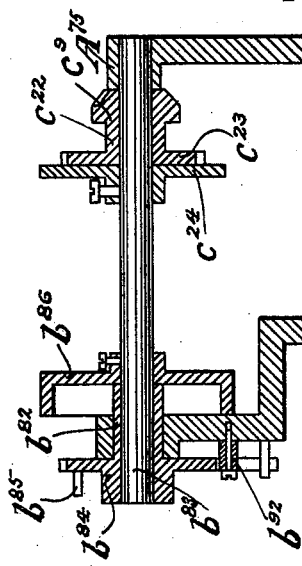
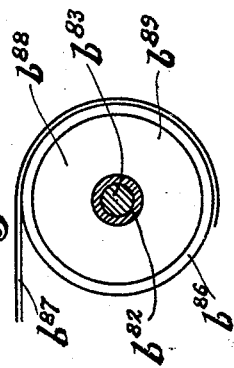
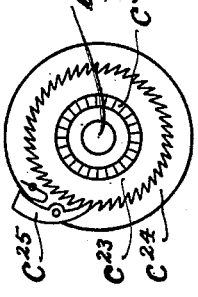
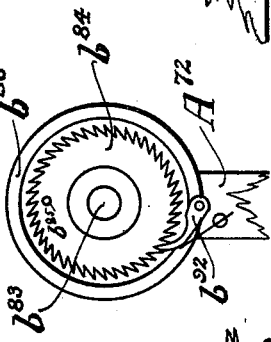
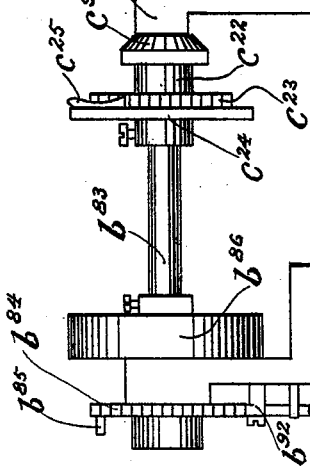
Attest—
Arthur T. Cahill,
M. H. Cahill
Inventor—
Thaddeus Cahill.

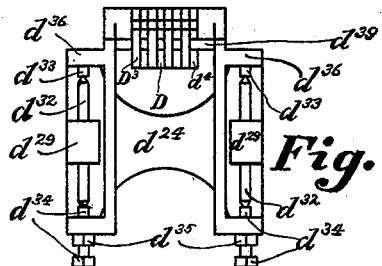

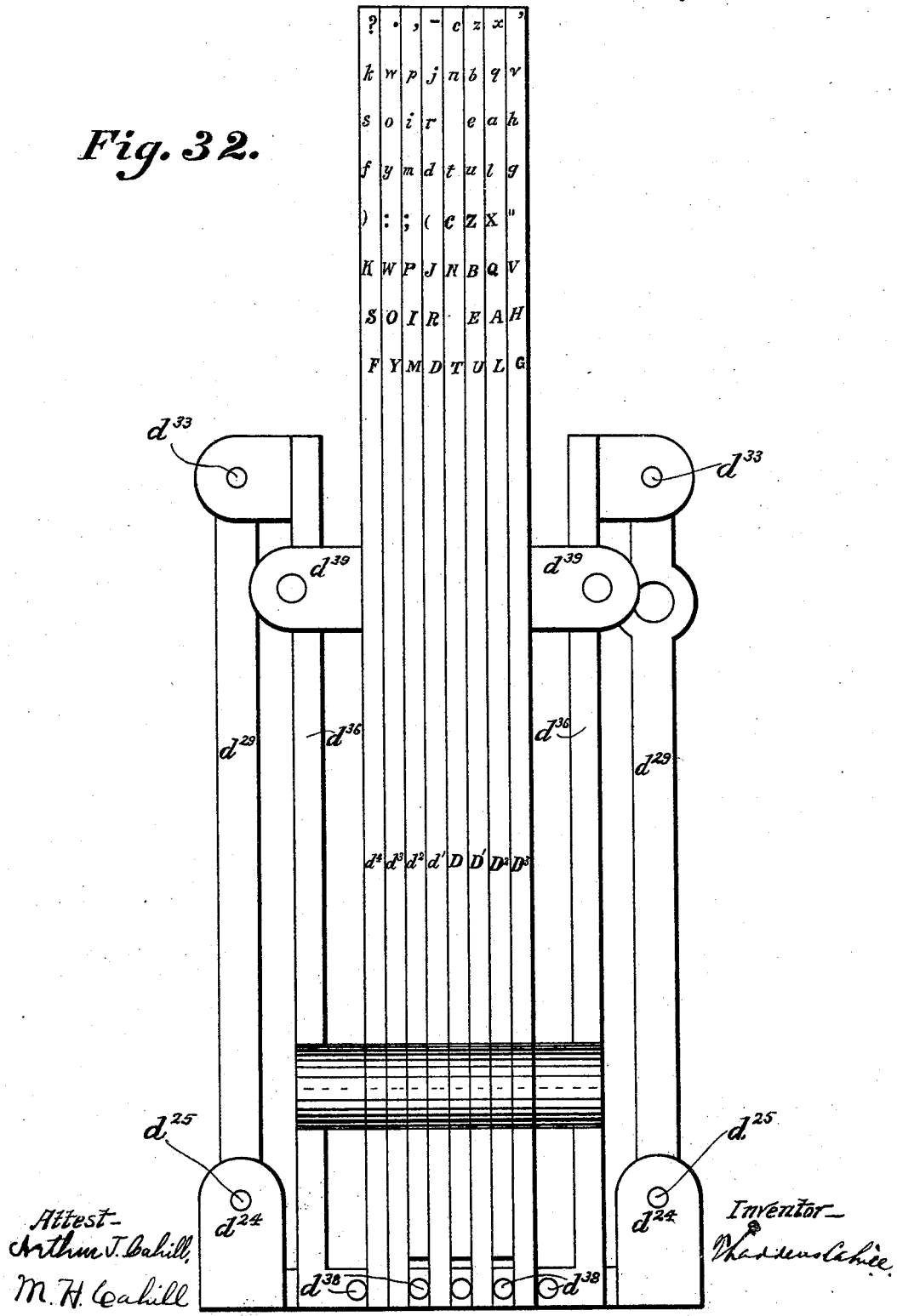

UNITED STATES PATENT OFFICE.

THADDEUS CAHILL, OF NEW YORK, N. Y.

TYPE-WRITING MACHINE.

SPECIFICATION forming part of Letters Patent No. 582,898, dated May 18, 1897.

Application filed July 30, 1894. Serial No. 518,912. (No model.)

*To all whom it may concern:*

Be it known that I, THADDEUS CAHILL, a citizen of the United States, and a resident of the city, county, and State of New York, temporarily residing at Washington, in the District of Columbia, have invented certain new and useful Improvements in Type-Writing Machines and other Similar Instruments, of which the following is a specification.

The object of my invention is to produce a light and strong metal type-form capable of carrying a large number of characters and of bringing any desired character to the printing-point with a small movement; and my invention consists in the parts, improvements, and combinations hereinafter described and claimed.

The mechanism figured in the accompanying drawings may be described briefly as consisting of (*a*) a main frame of cast-iron or other suitable material; (*b*) a paper-carriage suitably mounted for carrying the paper to be printed; (*c*) spacing mechanism for controlling the movements of the paper-carriage; (*d*) a ribbon, ribbon-spools, and ribbon-feed mechanism; (*e*) operating-keys; (*f*) a type-form, and (*g*) type-form-positioning mechanism intermediate the keys and the type-form. Such is the structure figured in the drawings. The main frame bears a general resemblance to the main frames of the machines illustrated in Letters Patent of the United States No. 502,700 granted to me on August 8, 1893, for improvements in type-writing machines, and in my pending applications for United States Letters Patent for improvements in type-writing machines, Serial Nos. 446,990, 446,991, and 446,992, filed September 24, 1892, and patented January 1, 1895, No. 531,904. If there be any novelty in the peculiar construction of main frame illustrated herein, no importance whatever is attached to it and any other suitable main frame may be used instead.

The form of carriage herein described, and particularly the arrangements for mounting the same, are believed to be novel, but they form the subject-matter of another application of mine for Letters Patent for improvements in type-writing machines, filed May 18, 1894, Serial No. 511,633. They are not claimed herein.

The spacing mechanism herein described and the arrangement of the ribbon-spools and ribbon-feed mechanism bear a general resemblance to the devices performing the same functions and described in the before-mentioned patent and pending applications. They are not claimed herein nor is any peculiar importance attached to them.

The movement-synthesizer mechanism interposed between the keys and the type-form and serving to position the type-form bears a general resemblance to the movement-synthesizer mechanism described in the before-mentioned Letters Patent to the specification of which Letters Patent reference is hereby had and made for a fuller description of movement-synthesizer mechanism. The movement-synthesizer mechanism herein described is not claimed by itself alone, and various other forms of movement-synthesizer mechanism or of type-form-positioning mechanism not being movement-synthesizer mechanism might be substituted for it.

The one essential feature of the present application is the peculiar form of type-form described with the means of mounting and controlling the same; but as the type-form is of novel construction and as in general all the details of a type-writing machine are dependent in a great degree upon the construction and arrangement of type-form employed I have thought best to illustrate practically the whole working machine, so that my present invention may be made clear as a part of a working whole. From the explanation given, however, it will now be easy for the reader to distinguish that which is of the essence of the present application from that which is merely collateral and related to it.

Figure 17:
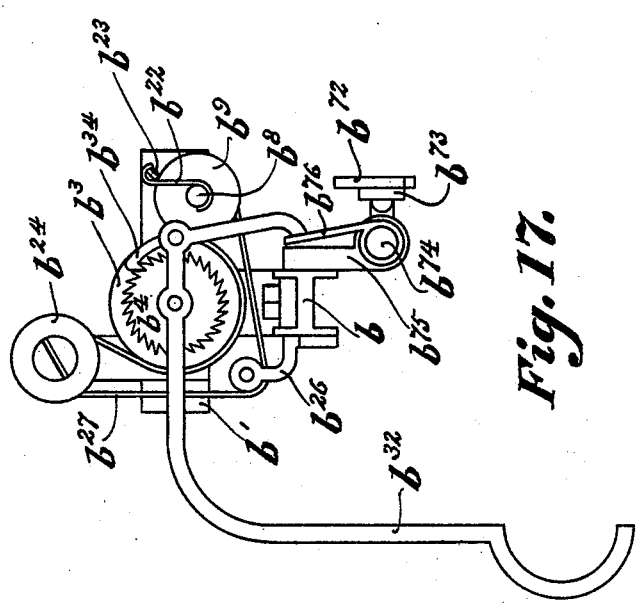

In the accompanying drawings, Figure 1 is a top view. Fig. 2 is a front elevation. Fig. 3 is a side elevation. Fig. 4 is a rear elevation illustrating the movement-synthesizer mechanism, the carriage, type-form, ribbon mechanism, spacing mechanism, and carriage-motor mechanism being omitted and portions of the back plate broken away. Fig. 5 is a sectional view, partly in plan, on the line *x x*, Figs. 2 and 3. Fig. 6 is a sectional view, partly in elevation, on the line *x x*, Figs. 1 and 4, portions of the mechanism being omitted. Fig. 7 is a sectional view, partly in elevation, on the line $y\ y$, Figs. 1 and 4, portions of the mechanism being omitted. Fig. 8 is a front elevation of the carriage and type-form, the carriage-hangers and some other portions of the mechanism being shown in section. Fig. 9 is a detail elevation, partly in section, in a plane parallel to the plane of Fig. 2 and on the line of the front surface of the paper-roll in Fig. 1, looking to the front of said figure, portions of the ribbon-spool-supporting casting being sectioned in a plane in front of the plane of the drawings. Fig. 10 is a detail rear elevation illustrating the carriage and spacing mechanism. Fig. 11 is a vertical elevation, partly in section, on the rear line of the brace-rail $A^{54}$ in Fig. 1, looking to the back of the machine, the brace-rail $A^{54}$ itself, however, which, in fact, lies immediately in front of the plane of the drawing, being shown. Fig. 12 is a detail rear elevation illustrating the back plate of the main frame. Fig. 13 is a plan view corresponding to Figs. 1 and 5, illustrating the bed-plate of the machine, most of the mechanism being removed, the back plate being shown partly in section to illustrate the manner of connecting this part with the bed-plate. Fig. 14 is a detail view, being a section on the line $x\ x$, Fig. 5, looking toward the front of the machine. Fig. 15 is a sectional elevation on the same line, looking toward the back of the machine. Fig. 15$^A$ is a detail section on the line $x\ x$, Fig. 13, looking toward the left. Fig. 15$^B$ is a detail section on the line $y\ y$, Fig. 13, looking toward the right. Fig. 15$^C$ is a detail plan illustrating a portion of the mechanism shown in Fig. 13, the key-supporting rib $A'$ being broken away in part to expose other portions of the mechanism to view. Fig. 16 is a detail cross-section in the plane of Fig. 6, illustrating the impression mechanism, portions of the mechanism shown in Fig. 6 being omitted in Fig. 16. Fig. 17 is an end view of the carriage, the end piece $b'$ being omitted. Fig. 18 is a detail illustrating the arrangement of the interlinear spacing pawl and ratchet. Fig. 19 is an elevation, partly in section, illustrating the spacing mechanism as viewed from behind. Fig. 19$^A$ is a detail elevation illustrating the spacing mechanism as viewed from the left-hand side of the machine. Fig. 19$^B$ is a detail section on the line $x\ x$, Fig. 19$^A$. Fig. 20 is a detail side elevation illustrating the carriage-motor mechanism and a portion of the ribbon-feed mechanism. Fig. 21 is a detail end elevation of a portion of the mechanism of Fig. 20, viewed from the left of Fig. 20. Fig. 22 is a similar view from the right of Fig. 20. Fig. 23 is a sectional view in elevation in a plane parallel to the plane of Fig. 20 and through the center of the mechanism shown in Fig. 20. Fig. 24 is a detail cross-section illustrating a portion of the mechanism shown in the preceding figures. Fig. 25 is a top view of the type-form. Fig. 26 is a front elevation of the type-form. Fig. 27 is a cross-section on the line $x\ x$, Fig. 26. Fig. 27$^A$ is a view similar to Fig. 27, the type-bars being omitted. Fig. 28 is a side elevation of the type-form. Fig. 29 is a vertical section through the type-form in a plane parallel to the plane of the preceding figure. Fig. 30 is a top view, and Fig. 31 a front elevation, of the casting to which the type-bars are attached and by which they are carried. Fig. 32 is a rear elevation of the type-form, drawn to a larger scale than the rest of the drawings, illustrating the arrangement of characters, each character, however, being shown, for the sake of clearness, naturally as it prints instead of inverted, as formed on the bar. Figs. 33 and 34 are detail elevations illustrating modifications of the connecting mechanism between the keys and rock-shafts, hereinafter described more at length.

The drawings are intended to represent the mechanism clearly, so as to enable a mechanic skilled in the art to reduce the invention to practice without other information than is contained herein. They do not pretend, however, to represent the parts in all cases with photographic accuracy, and in many of the views parts which would be seen in an exact projection are omitted.

*The main frame.*—The main frame is formed of cast-iron or other suitable material, and consists of (*a*) a bed-plate, (*b*) a back piece, (*c*) two side pieces, (*d*) a brace-rail connecting the two side pieces, and (*e*) various minor parts attached to those named. The bed-plate (see particularly Figs. 5 and 13) has a front rib A, a key-supporting rib $A'$, side ribs $A^2$ and $A^3$, and a rearward-extending rib $A^5$. The back plate (see particularly Figs. 3, 4, 6, 7, 8, 9, 11, and 13) has a bottom rib $A^{22}$, a top rib $A^{23}$, and vertical connecting-ribs $A^{24}$, $A^{25}$, $A^{26}$, $A^{27}$, and $A^{28}$. The ribs $A^{25}$, $A^{26}$, and $A^{27}$ are furnished with forward-extending projections $A^{29}$ $A^{29}$, &c. A bar $A^{32}$ is bolted to the projections $A^{29}$ $A^{29}$ of the rib $A^{25}$ parallel to said rib. A bar $A^{33}$ is bolted to the projections $A^{29}$ $A^{29}$ of the rib $A^{26}$ parallel to said rib $A^{26}$, and a bar $A^{34}$ is bolted to the projections $A^{29}$ $A^{29}$ of the rib $A^{27}$ parallel to said rib $A^{27}$. The side ribs $A^2$ and $A^3$ of the bed-plate are furnished at their rear ends with inwardly-facing projections $A^6$ $A^6$. The back piece is connected with the bed-plate by means of bolts which pass through the lower rib $A^{22}$ of the back piece into the parts $A^6$ $A^5$, $A^6$ of the latter binding them firmly together. The side pieces $A^{52}$ $A^{53}$ (see particularly Figs. 1, 2, 3, and 11) of the main frame are castings having each a lower horizontal part or foot, a vertical or upright part, and an upper horizontal backwardly-extending part. The lower horizontal part or foot is secured by bolts to one of the side ribs of the bed-plate, and the upper horizontal backwardly-extending part is secured by a bolt to the top rib $A^{23}$ of the back piece. A brace-rail $A^{54}$ is bolted to the side pieces $A^{52} A^{53}$ at their tops in front. Thus the bed-plate, back piece, and side pieces are all firmly bound together.

A casting $A^{62}$ of the form illustrated in the drawings (see particularly Figs. 1, 2, 20, and 23) is attached by bolts $A^{63} A^{63}$ to the front rib A. Said casting $A^{62}$ serves as a bearing for the horizontal ribbon-feed shaft hereinafter described, and also as a bearing for the vertical ribbon-spool shafts and quarter-turn pulleys hereinafter described.

A casting $A^{72}$, of the form illustrated in the drawings, (see particularly Figs. 1, 2, 3, and 5,) is attached by bolts $A^{73} A^{73}$ to the side rib $A^3$. Said casting $A^{72}$ serves to support the shaft upon which the wheel that moves the carriage is mounted and also to support one end of the ribbon-feed shaft hereinbefore mentioned and hereinafter described. It serves, moreover, to support one end of the rock-shaft, hereinafter described, by which motion is transmitted to the left-hand type-form.

A casting $A^{82}$, of the form illustrated in the drawings, (see particularly Figs. 1, 4, and 5,) is attached by machine-screws (not seen in the drawings) to the backward-extending part $A^5$ of the bed-plate and the rib $A^{22}$ of the back plate. Said casting $A^{82}$ serves to support one end of the shafts, hereinafter described, by which the type-form-elevating levers are mounted.

A casting $A^{92}$, of the form illustrated in the drawings, (see particularly Figs. 5, 10, 19, and 19$^A$,) is attached by bolts $A^{93} A^{93}$ to the backward-extending part $A^5$ of the bed-plate. Said casting serves to support the levers on which the spacing-dogs, hereinafter described, and certain other parts of the spacing mechanism are mounted.

A casting $A^{222}$, of the form illustrated in the drawings, (see particularly Figs. 5, 13, and 14,) is attached by bolts or machine-screws to the inside of the front rib A. Said casting $A^{222}$ serves to support the impression-hammers, hereinafter described, by which the type-levers of the two type-forms are thrown in against their respective printing-points.

A casting $A^{242}$, of the form illustrated in the drawings, (see particularly Figs. 1, 2, and 3,) is attached by bolts $A^{243} A^{243}$ to the side rib $A^2$. Said casting $A^{242}$ serves to support one end of the rock-shaft, hereinafter described, by which lateral motion is transmitted to the right-hand type-form from the movement-synthesizer at the back of the machine.

Castings $A^{252} A^{252}$, of the form illustrated in the drawings, (see particularly Figs. 2, 5, 8, and 11,) are attached by bolts $A^{253} A^{253}$ to the proximate faces of the side pieces $A^{52}$ and $A^{53}$. Parallel bars $A^{254}$ are bolted onto the proximate planed faces of each casting $A^{252} A^{252}$ by bolts $A^{255} A^{255}$. Plinths or washers $A^{256} A^{256}$ encircle the bolts $A^{255} A^{255}$ and serve to keep the bar $A^{254}$ the appropriate distance from the surface of the casting which it faces and with which it is parallel. The castings $A^{252} A^{252}$ with their parallel plates $A^{254} A^{254}$ serve as guides to permit of the movement vertically of the axes or centers of the radius pieces or hangers, hereinafter described, by which the carriage is supported without permitting any displacement of said parts from right to left.

Other minor parts of or attached to the main frame will be described farther along in this specification.

*The carriage mechanism.*—The paper-carriage (see particularly Figs. 1, 7, 8, 10, 17, and 18) is adapted and arranged to carry the paper to be printed. The carriage mechanism consists, in its most essential elements, of a carriage-frame, an impression-cylinder around which the paper passes and against which the type-levers strike when the letters and other characters are printed, a pressure-roller and elastic bands running on pulleys and serving to feed the paper to the impression-cylinder, interlinear spacing mechanism whereby the impression-cylinder is rotated and the paper fed forward from line to line, suitable hangers or mountings for the paper-carriage to permit of its movement to and fro as the printing is done, and mechanism for impelling the carriage. Of these in their order; but it is to be borne in mind that every part of the carriage mechanism shown is old and well known except the mounting arrangement, which, as before stated, forms the subject-matter of a prior application. The carriage-frame consists of a horizontal double-T rail $b$, of metal or other suitable material, and cast-metal end pieces $b'$ and $b^2$, firmly attached to the rail by bolts or screws. The impression-cylinder or paper-roll $b^3$ is made preferably of wood covered with vulcanite, according to the usual practice. Metal disks or end pieces $b^4$ and $b^5$, the first of which has a toothed periphery, are attached fast to the end of the paper-roll by screws. The roll $b^3$ is concentrically mounted by means of screws $b^6 b^6$, passing through holes in the carriage end pieces $b'$ and $b^2$ and set fast in the impression-cylinder end pieces $b^4$ and $b^5$. The pressure-roll $b^7$ has a metal shaft $b^8$ passing through its center. Small pulleys or band-wheels $b^9 b^9$ are attached fast to said shaft at each end of the roll $b^7$. The shaft $b^8$ is mounted in little hangers $b^{22} b^{22}$, which are fulcrumed upon shoulder-screws $b^{23} b^{23}$, set fast in the end pieces $b'$ and $b^2$. Band-wheels $b^{24}$ and $b^{25}$, respectively, lie at each end of the carriage in the same plane with the wheels $b^9 b^9$. The upper wheels $b^{24} b^{24}$ are centered upon shoulder-screws set fast in projections of the end pieces $b'$ and $b^2$. The lower band-wheels $b^{25} b^{25}$ are fulcrumed upon centers set fast in little castings $b^{26} b^{26}$, which are themselves screwed fast to the front surface of the double-T rail $b$. Strong elastic bands $b^{27} b^{27}$ pass around the sets of band-wheels $b^9 b^{24} b^{25}$ and $b^9 b^{24} b^{25}$, respectively, in the manner illustrated in the drawings. They serve to hold the paper in contact with the impression-cylinder $b^3$ and to feed it forward from line to line as the cylinder rotates. As before stated, the right-hand end piece $b^4$ of the cylinder $b^3$ is furnished with teeth. A space-handle $b^{32}$ is fulcrumed upon one of the screws $b^6$. A dog $b^{34}$ is pivotally attached to the space-handle. This dog is in engagement with the toothed periphery of the end piece $b^4$, so that when the lower end of the space-handle is pulled toward the operator the dog $b^{34}$ acts upon the toothed periphery of the wheel $b^4$ and rotates the impression-cylinder $b^3$ a line-space. A check-spring or lock-spring $b^{35}$, attached to the end piece $b'$, with its free end bearing upon and into the teeth of the ratchet-wheel $b^4$, serves to lock the wheel $b^4$ and the impression-cylinder connected therewith when not acted upon by the dog or feed-pawl $b^{34}$ and to insure a uniform movement from line to line. The construction and arrangement of the space-handle $b^{32}$, feed-pawl $b^{34}$, ratchet $b^4$, and lock-spring $b^{35}$ has been long in use in the art and requires no further description.

$b^{12}$ is a spring index-plate. It is made of sheet-steel or other suitable material and is screwed fast to the front surface of the double-T rail $b$. It serves both to assist in holding the paper against the paper-roll $b^3$ and as an index.

$b^{13}$ is a paper shelf or table. It is formed of sheet metal attached in a suitable manner to little castings $b^{44}$ $b^{44}$, which are screwed to the end pieces $b'$ and $b^2$.

A plate $b^{15}$ (omitted in Figs. 1, 2, 4, and 11) covers the space bounded by the top surfaces of $A^{52}$, $A^{54}$, $A^{53}$, and $A^{23}$ and serves to prevent the paper from becoming caught on the frame or entangled in the movement-synthesizer mechanism.

$b^{52}$ $b^{52}$ are parallel levers which are sometimes termed herein "radius-pieces" or "hangers." The carriage end pieces $b'$ and $b^2$ are pivotally mounted in these levers by means of pointed bolts $b^{53}$ $b^{53}$ (furnished with lock-nuts $b^{54}$ $b^{54}$) and points $b^{55}$ $b^{55}$. A tempered steel rod $b^{56}$ is fixed fast in each of the levers $b^{52}$ $b^{52}$. Said rod serves as a fulcrum to the lever. A guide formed by one of the castings $A^{252}$, with its parallel bar $A^{254}$, before described, serves to permit movement of the fulcrum-rod $b^{56}$ vertically and to prevent its displacement from right to left. Another lever, radius-piece, or hanger $b^{57}$ is furnished with a shaft $b^{58}$, firmly attached to it in a suitable manner—as, for instance, by shrinking. Said shaft is made pointed at one end, the point being tempered, set in a hole in a bar $b^{59}$, which is screwed fast to the brace-rail $A^{51}$. The other end of said shaft has a hole bored into it and is supported by a pointed bolt $b^{62}$, furnished with a lock-nut $b^{63}$. Thus the shaft $b^{58}$ and lever $b^{57}$ are mounted easily but firmly. A steel rod $b^{64}$, lying parallel with the shaft $b^{58}$ and the rod $b^{56}$, is firmly attached by shrinking or otherwise to the free end of the radius-piece or hanger $b^{57}$. This rod is journaled in the lever $b^{52}$, before mentioned, and held in place by a collar $b^{65}$. The three distances—(a) from the fulcrum of the shorter radius-piece $b^{57}$ to the center of attachment of said piece with the longer radius-piece $b^{52}$, (b) from the center of attachment of the longer and shorter radius-pieces to the center of attachment of the longer radius-piece $b^{52}$ with the carriage end piece $b'$ or $b^2$, and (c) from the center of attachment of the longer and shorter radius-piece to the axis or center of the longer radius-piece—to wit, the center of the rod $b^{56}$—are all exactly equal, so that the carriage moves in a right line, the fulcrums $b^{56}$ $b^{56}$ rising as the radius-pieces $b^{52}$ $b^{52}$ depart from the vertical exactly the distance which the carriage would fall if the radius-pieces $b^{52}$ $b^{52}$ moved upon fixed centers.

$b^{72}$ is the space-rack, which is firmly attached by screws to little castings $b^{73}$ $b^{73}$, which are themselves attached, by shrinking, to a rod $b^{74}$. Said rod is journaled in little castings $b^{75}$ $b^{75}$, which are screwed to the rear surface of the double-T rail $b$. An arm $b^{76}$ is attached to the right-hand end of the shaft $b^{74}$. The arm $b^{76}$ lies in front of the lower back end of the space-handle $b^{32}$, so that when the space-handle is pulled by the operator toward him it acts upon the arm $b^{76}$, so lifting the rack $b^{72}$ away from the space-dogs, hereinafter described, by which its movement is controlled.

*The carriage-motor.*—The carriage-motor arrangement herein described is exactly similar to that described in the specification of my before-mentioned Letters Patent No. 502,700 and involves nothing new. (See particularly Figs. 1, 2, 20, 23, and 24.) A sleeve $b^{82}$ is journaled in the casting $A^{72}$ before mentioned. A shaft $b^{83}$ is journaled in this sleeve and in the part $A^{74}$ of the casting $A^{72}$. A ratchet-wheel $b^{84}$, provided with a handle $b^{85}$, is formed integral with or otherwise suitably attached to the sleeve $b^{82}$. A wheel $b^{86}$ of the section shown is firmly attached to the shaft $b^{83}$ by shrinking or otherwise. A band or strap $b^{87}$ connects the wheel $b^{86}$ with the carriage, one end of said strap being connected with the carriage, while the other end is wound around the periphery of the wheel. A coiled spring $b^{88}$, having its inner end attached to the sleeve $b^{82}$ and its outer end attached to the wheel $b^{86}$ by a pin $b^{89}$, driven into the wheel $b^{86}$, serves to urge the wheel $b^{86}$ in the direction of the arrow, and thus to urge the carriage from right to left. A stop-pawl or catch $b^{92}$ serves to hold the ratchet-wheel $b^{84}$ and sleeve $b^{82}$ in any position that may be necessary to give the spring $b^{88}$ the required tension.

The spacing mechanism will be described after the type-form and type-form-controlling mechanism have been described.

*The ribbon arrangement.*—The ribbon arrangement herein described is, as before stated, substantially similar to that described in my before-mentioned Letters Patent No. 502,700 and involves no new invention. (See Figs. 1, 2, 9, 20, 22, and 23.) The inking-ribbon $c$ is wound on two spools $c'\ c'$. These spools are mounted, respectively, on shafts $c^2\ c^2$. The casting $A^{62}$ forms a bearing for these shafts. The ribbon passes also around—that is, turns an angle of about ninety degrees on—little quarter-turn pulleys $c^3\ c^3$, which are journaled between points supported by the forward-projecting arms $A^{64}\ A^{64}\ A^{64}\ A^{64}$ of the casting $A^{62}$. Each of the shafts $c'\ c'$ has a collar $c^4$ suitably attached to it—as, for instance, by a set-screw—immediately above the top of the casting $A^{62}$, and a miter-gear $c^5$ in like manner attached to it immediately below the casting $A^{62}$. In this manner displacement of the ribbon-spool shafts $c'\ c'$ is prevented.

$c^6$ is the horizontal ribbon-spool-driving shaft, carrying three miters $c^7$, $c^8$, and $c^8$, hereinafter described. The casting $A^{62}$ and the parts $A^{74}\ A^{75}$ of the casting $A^{72}$ form bearings for the ribbon-spool-driving shaft $c^6$—that is to say, one end of said shaft is supported by the parts $A^{74}\ A^{75}$ of the casting $A^{72}$, and the other end is supported by the hub of the right-most miter $c^5$, the miter being attached fast to the shaft $c^6$ and the hub of the miter journaled in the casting $A^{62}$, and the shaft $c^6$ is movable longitudinally in the direction of its axis in said bearings, as well as rotatively mounted therein. A miter-wheel $c^7$, lying between the parts $A^{74}$ and $A^{75}$ of the casting $A^{72}$, is loosely keyed or feathered to the shaft $c^6$ in such a manner that the two rotate together, while the shaft, notwithstanding, is free to move somewhat in the direction of its longitudinal axis without moving the wheel $c^7$. Said miter-wheel $c^7$ meshes with another miter-wheel $c^9$, which last-mentioned miter is formed at one end of a sleeve $c^{22}$, at the other end of which is an escapement or ratchet-wheel $c^{23}$. This escapement $c^{23}$ is formed as a part of the sleeve $c^{22}$ and miter $c^9$, before mentioned, and lies in close proximity to the flange $c^{24}$ and is connected therewith by means of a pawl or detent $c^{25}$, carried by the flange $c^{24}$ and normally spring-pressed against the ratchet-wheel $c^{23}$. The flange $c^{24}$, on which the detent $c^{25}$ is centered, is suitably attached to the shaft $b^{83}$—as, for instance, by a set-screw—so that it moves with said shaft. The sleeve $c^{22}$, on the contrary, and the miter-wheel $c^9$ and ratchet-wheel $c^{23}$, formed integral therewith, are mounted loosely upon said shaft $b^{83}$. The detent $c^{25}$, before mentioned, connects the parts in such a manner that the ratchet-wheel $c^{23}$, sleeve $c^{22}$, and miter $c^9$ move with the flange $c^{24}$ and shaft $b^{83}$ when the wheel $b^{86}$, mounted fast on said shaft, urges the carriage from right to left, as viewed from in front, but not when the carriage moves in the opposite direction. This movement of the escapement $c^{23}$, sleeve $c^{22}$, and miter $c^9$ in turn moves the miter-wheel $c^7$ and ribbon-spool-driving shaft $c^6$ and miter-wheels $c^8\ c^8$, which are firmly attached to the shaft $c^6$ in a suitable manner—as, for instance, by shrinking. Said miter-wheels $c^8\ c^8$ are arranged in such a manner that they mesh, respectively, with the miter-wheels $c^5\ c^5$, attached to the ribbon-spool shafts $c^2\ c^2$. The miters $c^8\ c^8$, however, are placed such a distance apart upon the ribbon-spool-driving shaft $c^6$ that when the right-hand miter-wheels $c^8$ and $c^5$ mesh with each other the left-hand pair $c^8$ and $c^5$ are disengaged, and vice versa; and the before-mentioned movement of the shaft $c^6$ in the direction of its longitudinal axis is for the purpose of bringing the miters $c^8\ c^8$, carried by said shaft $c^6$, alternately into engagement with the right-hand and left-hand ribbon-spool-shaft miters $c^5\ c^5$, so that the ribbon is first wound, say, from the right-hand spool onto the left-hand spool, and then vice versa, and so on alternately.

The means provided for moving the shaft $c^6$ longitudinally and for locking it in its right-hand and left-hand positions are the following: $c^{26}$ is a collar attached fast to the shaft $c$. A little lever $c^{27}$ serves as a detent. Said lever is supported by and fulcrumed upon a shoulder-screw set fast in the arm $A^{65}$ of the casting $A^{62}$. When said detent $c^{27}$ is dropped down on the right-hand side of the collar $c^{26}$, the left-hand pair of miters $c^8$ and $c^5$ are held in mesh with each other, and so, in like manner, when the detent is lifted and the shaft $c^6$ pushed to the right and the detent then dropped down on the left-hand side of the collar $c^{26}$ the right-hand pair of miters $c^8$ and $c^5$ are held in mesh with each other. Thus the ribbon is wound first one way and then the other, as desired.

It is now proper to describe the right-hand keys, the type-form corresponding thereto, and the means connecting the keys and type-form, and it will be best to describe first the type-form, and then the keys, and after that the connecting mechanism.

*The type-form.*—(See particularly Figs. 1, 2, 3, 5, 6, 9, 16, 25, 26, 27, 27$^A$, 28, 29, 30, 31, and 32.) The type-form consists, as figured in the drawings, of eight type-bars suitably mounted and carrying each eight characters. These bars are marked, respectively, D, D', D$^2$, D$^3$, $d'$, $d^2$, $d^3$, and $d^4$, of which the type-bar D lies normally immediately in front of the printing-point. Said bars are mounted for movement together up and down and from right to left for the positioning of the characters and for play individually in and out for the printing of the character brought to the printing-point in the following manner—that is to say: Parallel levers $d^{22}\ d^{22}$ are mounted on shafts or trunnions $d^{23}\ d^{23}$, supported by points or pointed screws set, respectively, in the bar $A^{33}$, before mentioned, and the casting $A^{82}$. $d^{24}$ is a casting having a vertical arm or leg and a horizontal body. The vertical arm of $d^{24}$ is pin-jointed to the outer ends of the levers $d^{22}\ d^{22}$, so that it is moved up and down as they move up and down. The horizontal body of the casting $d^{24}$ serves to support points $d^{25}\ d^{25}$ and screws $d^{26}\ d^{26}$, furnished with lock-nuts $d^{27}\ d^{27}$, between which horizontal shafts $d^{28}\ d^{28}$ are mounted. The shafts $d^{28}\ d^{28}$ serve to mount parallel guide-levers $d^{29}$ $d^{29}$, which carry at their tops shafts or trunnions $d^{32}$ $d^{32}$, which latter are pivotally connected by points $d^{33}$ $d^{33}$ and screws $d^{34}$ $d^{34}$ (furnished with lock-nuts $d^{35}$ $d^{35}$) with a casting $d^{36}$, which carries a fixed shaft $d^{37}$, on which the type-bars D, D', D$^2$, D$^3$, $d'$, $d^2$, $d^3$, and $d^4$ are mounted. Steel pins $d^{38}$ $d^{38}$, &c., serve to hold the various type-bars apart in their proper places below the center $d^{37}$, and above the center each bar is furnished with a tailpiece which lies in one of the recesses of the slotted cross-bar $d^{39}$. Steel type-bar springs (not shown in the drawings) serve to keep the type-bars normally in the positions shown in the drawings with reference to the casting $d^{36}$ and to return them to their normal positions when moved therefrom. It will be seen that by the parallel levers $d^{22}$ $d^{22}$ the type-form is mounted for movement in the direction of the length of the type-bars. By the other parallel levers $d^{29}$ $d^{29}$ the type-form is mounted for movement in a direction transverse to the length of the type-bars and across the type-form as a whole, while each individual type-bar has an in-and-out movement of its own on the shaft $d^{37}$ for printing. It remains now to describe how these various movements are effected.

The mechanism figured in the drawings for positioning the type-forms belongs to the genus movement-synthesizer described in the specification of the before-mentioned Letters Patent No. 502,700, granted to me on August 8, 1893, for improvements in type-writing machines, to which specification reference is hereby had and made for a fuller description of movement-synthesizer mechanism. By such mechanism a few keys are used individually and in various combinations to print numerous characters.

In the drawings (see particularly Figs. 1, 4, 6, 7, 11, and 16) there are ten keys for the right hand $e$, $e'$, $e^2$, $e^3$, E$^4$, $e^4$, E$^5$, $e^5$, E$^6$, and $e^6$. These keys serve to control two movement-synthesizers at the back of the machine, one of which serves to move the type-form up and down, while the other serves to move the type-form from side to side. The keys $e$, $e'$, $e^2$, E$^6$, and $e^6$ are connected with the movement-synthesizer that moves the type-form up and down and with that movement-synthesizer only. The keys $e^3$, E$^4$, $e^4$, E$^5$, and $e^5$ are connected with the movement-synthesizer that serves to move the type-form transversely and with that movement-synthesizer only, the keys $e^3$, $e^4$, and $e^5$ being each connected with one movement-synthesizer element only, while the keys E$^4$ and E$^5$ are each connected with two elements of the same movement-synthesizer.

The movement-synthesizer for moving the type-forms transversely (see particularly Figs. 4, 7, and 11) consists, most essentially, of three rock-levers or rock-arms $f'$, $f^2$, and $f^4$, two levers $h^2$ and $h^4$, and three links $g'$, $g^2$, and $g^4$, connecting the rock-arms $f'$, $f^2$, and $f^4$, respectively, with the levers $h^2$ and $h^4$. The lever $h^3$ is connected at one point with the link $g'$, at another point with the link $g^2$, and at a third point with the lever $h^4$. The lever $h^4$ is connected at one point with the lever $h^2$, as just stated, at another point with the link $g^4$, and at a third point by a link $h^5$ with the arm $h^6$ of the rock-shaft $h^7$, whose other arm $h^8$ is connected by a link $h^9$ with one of the levers $d^{29}$ $d^{29}$, by which the type-form is mounted for transverse or lateral movement. A hanger or hanging lever $h^{22}$, centered on a shoulder-screw $h^{23}$, screwed fast into the top rib A$^{23}$ of the back piece, is connected with the lever $h^2$ at the point at which said lever is connected with the link $g'$ and serves to hold the levers $h^2$ and $h^4$ in their proper vertical positions. The rock-arm $f'$ is connected by a push-up $k'$ with the keys E$^5$ and $e^5$. The rock-lever $f^2$ is connected by the push-up $k^2$ with the keys $e^4$ and E$^4$, and the rock-lever $f^4$ is connected by the push-up $k^4$ with the keys $e^3$, E$^4$, and E$^5$. The key E$^5$ when pressed down by the operator in front of the fulcrum rises back of the fulcrum, and through the reach-up $k'$ moves the arm $f'$ and link $g'$ from their normal position of parallelism with each other, rocking the lever $h^2$ on its point of connection with the link $g^2$ as a fulcrum, rocking the lever $h^4$ on its point of connection with the link $g^4$ as a fulcrum, rocking the rock-shaft $h^7$, and moving the link $h^9$ and the type-form one letter-space or type-bar space in the direction of the arrow, thus bringing the type-bar D' in front of the printing-point. The key $e^4$, when pressed down by the operator in front of the fulcrum, rises back of the fulcrum and through the reach-up $k^2$ moves the arm $f^2$ and the link $g^2$ from their normal positions of alinement with each other, rocking the lever $h^2$ on its point of connection with the link $g'$ as a fulcrum, rocking the lever $h^4$ on its point of connection with the link $g^4$ as a fulcrum, rocking the rock-shaft $h^7$, and moving the link $h^9$ and type-form two letter-spaces or type-bar spaces in the direction of the arrow, thus bringing the type-bar D$^2$ in front of the printing-point. The keys $e^4$ and $e^5$, when pressed down simultaneously by the operator in front of the fulcrum, rise back of the fulcrum, and each in the manner described effects the movement already described, so that the type-form is moved three type-bar spaces in the direction of the arrow and the type-bar D$^3$ brought in front of the printing-point. The key $e^3$, when pressed down by the operator in front of the fulcrum, rises back of the fulcrum, and through the reach-up $k^4$ moves the arm $f^4$ and link $g^4$ from their normal positions of aline-with each other, rocking the lever $h^4$ on its point of connection with the lever $h^2$ as a fulcrum, rocking the rock-shaft $h^7$, and moving the link $h^9$ and type-form four letter-spaces in the direction contrary to the arrow, thus bringing the type-form $d^4$ in front of the printing-point. The key E$^5$ is a combination-key exactly equivalent to the keys $e^5$ and $e^3$; and the same effect may be produced by depressing $e^5$ and $e^3$ simultaneously or by depressing E$^5$ bon $c$ is wound on two spools $c'$ $c'$. These spools are mounted, respectively, on shafts $c^2$ $c^2$. The casting $A^{62}$ forms a bearing for these shafts. The ribbon passes also around—that is, turns an angle of about ninety degrees on—little quarter-turn pulleys $c^3$ $c^3$, which are journaled between points supported by the forward-projecting arms $A^{64}$ $A^{64}$ $A^{64}$ $A^{64}$ of the casting $A^{62}$. Each of the shafts $c'$ $c'$ has a collar $c^4$ suitably attached to it—as, for instance, by a set-screw—immediately above the top of the casting $A^{62}$, and a miter-gear $c^5$ in like manner attached to it immediately below the casting $A^{62}$. In this manner displacement of the ribbon-spool shafts $c'$ $c'$ is prevented.

$c^6$ is the horizontal ribbon-spool-driving shaft, carrying three miters $c^7$, $c^8$, and $c^8$, hereinafter described. The casting $A^{62}$ and the parts $A^{74}$ $A^{75}$ of the casting $A^{72}$ form bearings for the ribbon-spool-driving shaft $c^6$—that is to say, one end of said shaft is supported by the parts $A^{74}$ $A^{75}$ of the casting $A^{72}$, and the other end is supported by the hub of the rightmost miter $c^5$, the miter being attached fast to the shaft $c^6$ and the hub of the miter journaled in the casting $A^{62}$, and the shaft $c^6$ is movable longitudinally in the direction of its axis in said bearings, as well as rotatively mounted therein. A miter-wheel $c^7$, lying between the parts $A^{74}$ and $A^{75}$ of the casting $A^{72}$, is loosely keyed or feathered to the shaft $c^6$ in such a manner that the two rotate together, while the shaft, notwithstanding, is free to move somewhat in the direction of its longitudinal axis without moving the wheel $c^7$. Said miter-wheel $c^7$ meshes with another miter-wheel $c^9$, which last-mentioned miter is formed at one end of a sleeve $c^{22}$, at the other end of which is an escapement or ratchet-wheel $c^{23}$. This escapement $c^{23}$ is formed as a part of the sleeve $c^{22}$ and miter $c^9$, before mentioned, and lies in close proximity to the flange $c^{24}$ and is connected therewith by means of a pawl or detent $c^{25}$, carried by the flange $c^{24}$ and normally spring-pressed against the ratchet-wheel $c^{23}$. The flange $c^{24}$, on which the detent $c^{25}$ is centered, is suitably attached to the shaft $b^{83}$—as, for instance, by a set-screw—so that it moves with said shaft. The sleeve $c^{22}$, on the contrary, and the miter-wheel $c^9$ and ratchet-wheel $c^{23}$, formed integral therewith, are mounted loosely upon said shaft $b^{83}$. The detent $c^{25}$, before mentioned, connects the parts in such a manner that the ratchet-wheel $c^{23}$, sleeve $c^{22}$, and miter $c^9$ move with the flange $c^{24}$ and shaft $b^{83}$ when the wheel $b^{86}$, mounted fast on said shaft, urges the carriage from right to left, as viewed from in front, but not when the carriage moves in the opposite direction. This movement of the escapement $c^{23}$, sleeve $c^{22}$, and miter $c^9$ in turn moves the miter-wheel $c^7$ and ribbon-spool-driving shaft $c^6$ and miter-wheels $c^8$ $c^8$, which are firmly attached to the shaft $c^6$ in a suitable manner—as, for instance, by shrinking. Said miter-wheels $c^8$ $c^8$ are arranged in such a manner that they mesh, respectively, with the miter-wheels $c^5$ $c^5$, attached to the ribbon-spool shafts $c^2$ $c^2$. The miters $c^8$ $c^8$, however, are placed such a distance apart upon the ribbon-spool-driving shaft $c^6$ that when the right-hand miter-wheels $c^8$ and $c^5$ mesh with each other the left-hand pair $c^8$ and $c^5$ are disengaged, and vice versa; and the before-mentioned movement of the shaft $c^6$ in the direction of its longitudinal axis is for the purpose of bringing the miters $c^8$ $c^8$, carried by said shaft $c^6$, alternately into engagement with the right-hand and left-hand ribbon-spool-shaft miters $c^5$ $c^5$, so that the ribbon is first wound, say, from the right-hand spool onto the left-hand spool, and then vice versa, and so on alternately.

The means provided for moving the shaft $c^6$ longitudinally and for locking it in its right-hand and left-hand positions are the following: $c^{26}$ is a collar attached fast to the shaft $c$. A little lever $c^{27}$ serves as a detent. Said lever is supported by and fulcrumed upon a shoulder-screw set fast in the arm $A^{65}$ of the casting $A^{62}$. When said detent $c^{27}$ is dropped down on the right-hand side of the collar $c^{26}$, the left-hand pair of miters $c^8$ and $c^5$ are held in mesh with each other, and so, in like manner, when the detent is lifted and the shaft $c^6$ pushed to the right and the detent then dropped down on the left-hand side of the collar $c^{26}$ the right-hand pair of miters $c^8$ and $c^5$ are held in mesh with each other. Thus the ribbon is wound first one way and then the other, as desired.

It is now proper to describe the right-hand keys, the type-form corresponding thereto, and the means connecting the keys and type-form, and it will be best to describe first the type-form, and then the keys, and after that the connecting mechanism.

*The type-form.*—(See particularly Figs. 1, 2, 3, 5, 6, 9, 16, 25, 26, 27, 27$^A$, 28, 29, 30, 31, and 32.) The type-form consists, as figured in the drawings, of eight type-bars suitably mounted and carrying each eight characters. These bars are marked, respectively, D, D', $D^2$, $D^3$, $d'$, $d^2$, $d^3$, and $d^4$, of which the type-bar D lies normally immediately in front of the printing-point. Said bars are mounted for movement together up and down and from right to left for the positioning of the characters and for play individually in and out for the printing of the character brought to the printing-point in the following manner—that is to say: Parallel levers $d^{22}$ $d^{22}$ are mounted on shafts or trunnions $d^{23}$ $d^{23}$, supported by points or pointed screws set, respectively, in the bar $A^{33}$, before mentioned, and the casting $A^{82}$. $d^{24}$ is a casting having a vertical arm or leg and a horizontal body. The vertical arm of $d^{24}$ is pin-jointed to the outer ends of the levers $d^{22}$ $d^{22}$, so that it is moved up and down as they move up and down. The horizontal body of the casting $d^{24}$ serves to support points $d^{25}$ $d^{25}$ and screws $d^{26}$ $d^{26}$, furnished with locknuts $d^{27}$ $d^{27}$, between which horizontal shafts $d^{28}$ $d^{28}$ are mounted. The shafts $d^{28}$ $d^{28}$ serve to mount parallel guide-levers $d^{29}$ $d^{29}$, which carry at their tops shafts or trunnions $d^{32}$ $d^{32}$, which latter are pivotally connected by points $d^{33}$ $d^{33}$ and screws $d^{34}$ $d^{34}$ (furnished with lock-nuts $d^{35}$ $d^{35}$) with a casting $d^{36}$, which carries a fixed shaft $d^{37}$, on which the type-bars D, D', D², D³, $d'$, $d^2$, $d^3$, and $d^4$ are mounted. Steel pins $d^{38}$ $d^{38}$, &c., serve to hold the various type-bars apart in their proper places below the center $d^{37}$, and above the center each bar is furnished with a tailpiece which lies in one of the recesses of the slotted cross-bar $d^{39}$. Steel type-bar springs (not shown in the drawings) serve to keep the type-bars normally in the positions shown in the drawings with reference to the casting $d^{36}$ and to return them to their normal positions when moved therefrom. It will be seen that by the parallel levers $d^{22}$ $d^{22}$ the type-form is mounted for movement in the direction of the length of the type-bars. By the other parallel levers $d^{29}$ $d^{29}$ the type-form is mounted for movement in a direction transverse to the length of the type-bars and across the type-form as a whole, while each individual type-bar has an in-and-out movement of its own on the shaft $d^{37}$ for printing. It remains now to describe how these various movements are effected.

The mechanism figured in the drawings for positioning the type-forms belongs to the genus movement-synthesizer described in the specification of the before-mentioned Letters Patent No. 502,700, granted to me on August 8, 1893, for improvements in type-writing machines, to which specification reference is hereby had and made for a fuller description of movement-synthesizer mechanism. By such mechanism a few keys are used individually and in various combinations to print numerous characters.

In the drawings (see particularly Figs. 1, 4, 6, 7, 11, and 16) there are ten keys for the right hand $e$, $e'$, $e^2$, $e^3$, E⁴, $e^4$, E⁵, $e^5$, E⁶, and $e^6$. These keys serve to control two movement-synthesizers at the back of the machine, one of which serves to move the type-form up and down, while the other serves to move the type-form from side to side. The keys $e$, $e'$, $e^2$, E⁶, and $e^6$ are connected with the movement-synthesizer that moves the type-form up and down and with that movement-synthesizer only. The keys $e^3$, E⁴, $e^4$, E⁵, and $e^5$ are connected with the movement-synthesizer that serves to move the type-form transversely and with that movement-synthesizer only, the keys $e^3$, $e^4$, and $e^5$ being each connected with one movement-synthesizer element only, while the keys E⁴ and E⁵ are each connected with two elements of the same movement-synthesizer. The movement-synthesizer for moving the type-forms transversely (see particularly Figs. 4, 7, and 11) consists, most essentially, of three rock-levers or rock-arms $f'$, $f^2$, and $f^4$, two levers $h^2$ and $h^4$, and three links $g'$, $g^2$, and $g^4$, connecting the rock-arms $f'$, $f^2$, and $f^4$, respectively, with the levers $h^2$ and $h^4$. The lever $h^3$ is connected at one point with the link $g'$, at another point with the link $g^2$, and at a third point with the lever $h^4$. The lever $h^4$ is connected at one point with the lever $h^2$, as just stated, at another point with the link $g^4$, and at a third point by a link $h^5$ with the arm $h^6$ of the rock-shaft $h^7$, whose other arm $h^8$ is connected by a link $h^9$ with one of the levers $d^{29}$ $d^{29}$, by which the type-form is mounted for transverse or lateral movement. A hanger or hanging lever $h^{22}$, centered on a shoulder-screw $h^{23}$, screwed fast into the top rib A²³ of the back piece, is connected with the lever $h^2$ at the point at which said lever is connected with the link $g'$ and serves to hold the levers $h^2$ and $h^4$ in their proper vertical positions. The rock-arm $f'$ is connected by a push-up $k'$ with the keys E⁵ and $e^5$. The rock-lever $f^2$ is connected by the push-up $k^2$ with the keys $e^4$ and E⁴, and the rock-lever $f^4$ is connected by the push-up $k^4$ with the keys $e^3$, E⁴, and E⁵. The key E⁵ when pressed down by the operator in front of the fulcrum rises back of the fulcrum, and through the reach-up $k'$ moves the arm $f'$ and link $g'$ from their normal position of parallelism with each other, rocking the lever $h^2$ on its point of connection with the link $g^2$ as a fulcrum, rocking the lever $h^4$ on its point of connection with the link $g^4$ as a fulcrum, rocking the rock-shaft $h^7$, and moving the link $h^9$ and the type-form one letter-space or type-bar space in the direction of the arrow, thus bringing the type-bar D' in front of the printing-point. The key $e^4$, when pressed down by the operator in front of the fulcrum, rises back of the fulcrum and through the reach-up $k^2$ moves the arm $f^2$ and the link $g^2$ from their normal positions of alinement with each other, rocking the lever $h^2$ on its point of connection with the link $g'$ as a fulcrum, rocking the lever $h^4$ on its point of connection with the link $g^4$ as a fulcrum, rocking the rock-shaft $h^7$, and moving the link $h^9$ and type-form two letter-spaces or type-bar spaces in the direction of the arrow, thus bringing the type-bar D² in front of the printing-point. The keys $e^4$ and $e^5$, when pressed down simultaneously by the operator in front of the fulcrum, rise back of the fulcrum, and each in the manner described effects the movement already described, so that the type-form is moved three type-bar spaces in the direction of the arrow and the type-bar D³ brought in front of the printing-point. The key $e^3$, when pressed down by the operator in front of the fulcrum, rises back of the fulcrum, and through the reach-up $k^4$ moves the arm $f^4$ and link $g^4$ from their normal positions of aline- with each other, rocking the lever $h^4$ on its point of connection with the lever $h^2$ as a fulcrum, rocking the rock-shaft $h^7$, and moving the link $h^9$ and type-form four letter-spaces in the direction contrary to the arrow, thus bringing the type-form $d^4$ in front of the printing-point. The key E⁵ is a combination-key exactly equivalent to the keys $e^5$ and $e^3$; and the same effect may be produced by depressing $e^5$ and $e^3$ simultaneously or by depressing E⁵ alone, for $E^5$, when depressed, acts through the reach-up $k'$ upon the rock-arm $f'$ and link $g'$ and through the reach-up $k^4$ upon the rock-lever $f^4$ and link $g^4$, and the movement of one letter-space in the direction of the arrow belonging to the rock-arm $f'$ and link $g'$ is subtracted from the movement of four letter-spaces in the contrary direction belonging to the rock-arm $f^4$ and link $g^4$, and the type-form is given a resultant movement of three letter-spaces, which brings the type-bar $d^3$ in front of the printing-point. The key $E^4$ is also a combination-key, exactly equivalent to the keys $e^4$ and $e^3$, and the same effect may be produced by depressing $e^4$ and $e^3$ simultaneously or by depressing $E^4$ alone, for the key $E^4$, when depressed, acts through the reach-up $k^2$ upon the rock-lever $f^2$ and link $g^2$, and through the reach-up $k^4$ upon the rock-lever $f^4$ and link $g^4$, and the movement of two letter-spaces in the direction of the arrow belonging to the rock-lever $f^2$ and link $g^2$ is subtracted from the movement of four letter-spaces in the contrary direction belonging to the rock-lever $f^4$ and link $g^4$, so that the type-form is given a net or resultant movement of two letter-spaces in the direction opposite to that of the arrow, which brings the type-bar $d^2$ in front of the printing-point. The keys $E^4$ and $E^5$ are together equal to the keys $e^3$, $e^4$, and $e^5$, so that the same effect may be produced by depressing $e^3$, $e^4$, and $e^5$ together or by depressing $E^4$ and $E^5$ together. In either case the rock-levers $f'$, $f^2$, and $f^4$ and links $g'$, $g^2$, and $g^4$ are moved from their normal positions, and the movement of one letter-space in the direction of the arrow belonging to the arm $f'$ and link $g'$ and the movement of two letter-spaces in the direction of the arrow belonging to the rock-lever $f^2$ and link $g^2$ are both subtracted from the movement of four letter-spaces in the contrary direction belonging to the rock-lever $f^4$ and link $g^4$, so that the type-form is moved but one letter-space in the direction contrary to the arrow, which brings the type-bar $d'$ in front of the printing-point. So much in this place for the lateral positioning of the type-form.

The keys $e$, $e'$, $e^2$, $E^6$, and $e^6$, as before stated, serve to position the type-form vertically. The movement-synthesizer employed for this purpose (see particularly Figs. 4, 11, and 16) consists, most essentially, of three rock-shafts $L'$, $L^2$, and $L^4$, with rock-arms marked, respectively, $m'$, $M'$, $m^2$, $M^2$, $m^4$, and $M^4$, levers $o^2$ and $o^4$, and links $n'$, $n^2$, and $n^4$, connecting the arms $m'$, $m^2$, and $m^4$, respectively, of the rock-shafts $L'$, $L^2$, and $L^4$ with the levers $o^2$ and $o^4$. The lever $o^2$ is connected at one point with the link $n'$, at another point with the link $n^2$, and at a third point with the lever $o^4$. The lever $o^4$ is connected at one point with the lever $o^2$, as just stated, at another point with the link $n^4$, and at a third point said lever $o^4$ is connected with the vertical arm $d^{42}$ of the type-bar-raising lever $d^{22}$. The arm $M'$ of the rock-shaft $L'$ is connected by the reach-up $l'$ with the keys $e^2$ and $e'$. The arm $M^2$ of the rock-shaft $L^2$ is connected by the reach-up $l^2$ with the keys $e$ and $e'$, and the arm $M^4$ of the rock-shaft $L^4$ is connected by the reach-up $l^4$ with the keys $E^6$ and $e^6$. When the key $e^2$ is depressed by the operator in front of the fulcrum, it rises back of the fulcrum and through the reach-up $l'$ and arm $M'$ rocks the rock-shaft $L'$, moves the arm $m'$ and link $n'$ from their normal positions of alinement with each other, and moves the lever $o^2$ on its point of connection with the link $n^2$ as a fulcrum, which in turn moves the lever $o^4$ on its point of connection with the link $n^4$ as a fulcrum and raises the type-bar-raising levers $d^{22}$ $d^{22}$ and the type-form one letter-space. When the key $e$ is depressed by the operator in front of the fulcrum, it rises back of the fulcrum and through the reach-up $l^2$ and arm $M^2$ rocks the rock-shaft $L^2$, moves the arm $m^2$ and link $n^2$ from their normal position of alinement with each other, and moves the lever $o^2$ on its point of connection with the link $n'$ as a fulcrum, which in turn moves the lever $o^4$ on its point of connection with the link $n^4$ as a fulcrum and depresses the type-bar-raising levers $d^{22}$ $d^{22}$ and the type-form two letter-spaces. When the key $e'$ is depressed by the operator in front of the fulcrum, it rises back of the fulcrum and through the reach-ups $l'$ and $l^2$ and arms $M'$ and $M^2$ rocks the rock-shafts $L'$ and $L^2$, moving the arms $m'$ and $m^2$ from their normal positions of alinement with their respective links $n'$ and $n^2$, giving the lever $o^2$ a movement compounded of the individual movements given to it by the links $n'$ and $n^2$ and moving the lever $o^4$ on its point of connection with the link $n^4$ as a fulcrum and depressing the type-form-raising levers $d^{22}$ $d^{22}$ and the type-form one letter-space. When either of the keys $e^6$ $E^6$ is depressed by the operator in front of the fulcrum, it rises back of the fulcrum and through the reach-up $l^4$ and arm $M^4$ rocks the rock-shaft $L^4$, moving the arm $m^4$ and link $n^4$ from their normal positions of alinement with each other, moving the lever $o^4$ on its point of connection with the lever $o^2$ as a fulcrum, and raising the type-form-raising levers $d^{22}$ $d^{22}$ four letter-spaces. If either of the keys $e^6$ or $E^6$ be depressed by the operator simultaneously with the key $e^2$, the movement of one letter-space given to the type-form by the key $e^2$ is added to that of four letter-spaces given by the key $e^6$ or $E^6$ and the type-form is raised five letter-spaces. If either of the keys $e^6$ or $E^6$ be depressed by the operator simultaneously with the key $e$, the movement of two letter-spaces downward belonging to the key $e$ is subtracted from the movement of four letter-spaces upward belonging to the key $E^6$ or $e^6$, so that there is a net upward movement of the type-form of two letter-spaces, and if either of the keys $e^6$ or $E^6$ be depressed simultaneously with the key $e'$, the movement of one letter-space downward belonging to the key $e'$ is subtracted from the movement of four letter-spaces upward belonging to the key $e^6$ or $E^6$, leaving a net upward movement of three letter-spaces.

To recapitulate: The type-bar D stands normally in front of the printing-point. The type-bar D' is brought in front of the printing-point by depressing the key $e^5$. The type-bar $D^2$ is brought in front of the printing-point by depressing the key $e^4$. The type-bar $D^3$ is brought in front of the printing-point by depressing the keys $e^4$ and $e^5$. The type-bar $d'$ is brought in front of the printing-point by depressing the keys $e^3$, $e^4$, and $e^5$ or by depressing the combination-keys $E^4$ and $E^5$. The type-bar $d^2$ is brought in front of the printing-point by depressing the keys $e^3$ and $e^4$ or by depressing the combination-key $E^4$. The type-bar $d^3$ is brought in front of the printing-point by depressing the keys $e^3$ and $e^5$ or by depressing the combination-key $E^5$, and the type-bar $d^4$ is brought in front of the printing-point by depressing the key $e^3$.

Each type-bar carries, as before mentioned, eight characters arranged vertically one above the other. Counting from the bottom upward, the first or lowest character on each type-bar is brought to the level of the printing-point by depressing the keys $e^2$ and $e^6$ or $E^6$ simultaneously. The second character on each type-bar is brought to the level of the printing-point by depressing the key $e^6$ or the key $E^6$. The third character on each type-bar is brought to the level of the printing-point by depressing the key $e^6$ or the key $E^6$ with the keys $e$ and $e^2$, or with the key $e'$, (which is equivalent to $e$ and $e^2$ because it operates the parts belonging to both those keys.) The fourth character on each type-bar is brought to the level of the printing-point by depressing the key $e^6$ or the key $E^6$ simultaneously with the key $e$. The fifth character on each type-bar is brought to the level of the printing-point by depressing the key $e^2$. The sixth character on each type-bar lies normally on a level with the printing-point. The seventh character on each type-bar is brought to the level of the printing-point by depressing the keys $e$ and $e^2$, or the key $e'$, which is equivalent to them, and the eighth character on each type-bar is brought to the level of the printing-point by depressing the key $e$.

The characters may be arranged upon the type-form in the order represented in the diagrammatic view Fig. 16, (which represents each character naturally as it prints, instead of showing them inverted as they stand on the type-form,) or in any other manner desired. Whatever the arrangement, to print any given character depress the key or keys, if any, necessary to bring the particular type-bar on which the character is formed in front of the printing-point, and depress also at the same time the key or keys, if any, necessary to bring a character on the level of the particular character to be printed to the level of the printing-point, as already explained.

With the characters arranged as represented in Fig. 16 the various letters and other characters are brought to the printing-point by the various keys as set forth in the following table, (the combination-keys $e'$, $E^4$, and $E^5$ being in all cases given instead of the simple keys $e'$ and $e^2$, $e^3$ and $e^4$, and $e^3$ and $e^5$, to which said combination-keys are respectively equal,) to wit:

a by the key $e^4$.
b by the keys $e'$ and $e^5$.
c by the key $e$.
d by the keys $e^2$, $E^4$, and $E^5$.
e by the key $e^5$.
f by the keys $e^2$ and $e^3$.
g by the keys $e^2$, $e^4$, and $e^5$.
h by the keys $e^4$ and $e^5$.
i by the key $E^4$.
j by the keys $e'$, $E^4$, and $E^5$.
k by the keys $e'$ and $e^3$.
l by the keys $e^2$ and $e^4$.
m by the keys $e^2$ and $E^4$.
n by the key $e'$.
o by the key $E^5$.
p by the keys $e'$ and $E^4$.
q by the keys $e'$ and $e^4$.
r by the keys $E^4$ and $E^5$.
s by the key $e^3$.
t by the key $e^2$.
u by the keys $e^3$ and $e^5$.
v by the keys $e'$, $e^4$, and $e^5$.
w by the keys $e'$ and $E^5$.
x by the keys $e$ and $e^4$.
y by the keys $e^2$ and $E^5$.
z by the keys $e$ and $e^5$.

To produce any capital letter, depress the key or keys that produce that letter lower case, and depress also at the same time the key $e^6$ or the key $E^6$.

The various marks of punctuation are produced by the various keys as follows, to wit:
, by the keys $e$ and $E^4$.
. by the keys $e$ and $E^5$.
' by the keys $e$, $e^4$, and $e^5$.
- by the keys $e$, $E^4$, and $E^5$.
? by the keys $e$ and $e^3$.
; by the keys $e$, $E^4$, and $E^6$.
: by the keys $e$, $E^5$, and $E^6$.
" by the keys $e$, $e^4$, $e^5$, and $e^6$.
( by the keys $e$, $E^4$, $E^5$, and $E^6$.
) by the keys $e$, $e^3$, and $e^6$.

Numbers may be written by the Roman notation or spelled out in full, or, if desired, an additional row of characters may be added to the type-form for the numerals 2 to 9, inclusive, and an additional element added to the movement synthesizer and an additional key to the keyboard for the controlling of such element. This will be readily understood.

*The impression mechanism.*—It remains to describe the manner in which the character is printed after it has been brought to the printing-point in the manner already described. (See particularly Figs. 2, 5, 13, 14, 15, 15$^A$, 15$^B$, 15$^C$, and 16.) Underneath the right-hand keys is a frame formed of a shaft P, and a front and side piece P'. The shaft P is fulcrumed between points, as shown in the drawings, and the part P' is so placed that it is acted on by any key that is depressed.

A hammer $p$ is mounted on a shaft or trunnion $p'$, which latter is supported between centers or points, as shown in the drawings, which points are set fast in the casting A, attached to the front rib A of the main frame. On the shaft $p'$ is an arm $p^2$. A screw having the portion remote from the head threadless is set fast in the arm $p^2$ and projects under the part P' of the frame, before mentioned, so that whenever any of the right-hand keys are depressed the frame formed of parts P and P' is moved thereby, the arm $p^2$ is moved downward, and the hammer $p$ thrown in. The parts are so adjusted that the hammer $p$ when moved in as far as it is impelled by the keys—that is, as far as it would be carried by the keys if depressed very slowly—still stands some distance in front of the type-bar to be struck, so that when the keys have been depressed as far as they are depressed an instant is left for the arresting of the type-form in its proper position before the hammer, which continues to move in under the influence of the momentum imparted to it by the keys, strikes the type-bar lying in front of the printing-point from which the printing is to be done and carries it in against the printing-point with sufficient force to print. The hammer and type-bar, of course, rebound immediately after the impact and return to their normal positions as the keys are released.

*The spacing mechanism*, (see particularly Figs. 5, 10, 13, 14, 15, 15$^A$, 15$^B$, 15$^C$, 19, 19$^A$, and 19$^B$.)—$b^{72}$ is the space-rack, before mentioned. The carriage is urged in the direction of the arrow by the motor-spring arrangement, hereinbefore described, and the movements of the carriage necessary for the letter-spacing are controlled by a pair of dogs—a loose dog and a fast dog—mounted upon a dog-carrying lever, the movements of which are controlled by the keys. Said dog-carrying lever is formed of two parts H and H', connected together by machine-screws, the holes in the part H through which said screws pass being made elliptical or elongated to permit of the adjustment of the part H upon the part H', so as to bring the space-dogs, hereinafter described, closer together or farther apart, as desired, suitable washers being placed between the part H' and the heads of the screws. There are, as before said, two space-dogs, a "fast" dog and a "loose" dog, the former being so called because it has no movement in the line of motion of the rack $b^{72}$ and the latter being so termed because it has a movement in the same plane and tangent to the line of motion of said rack $b^{72}$. Both dogs have an up-and-down movement. To this end the fast dog H$^3$ is connected with the part H of the dog-carrying lever by a little center pin, and the loose dog H$^4$ is in like manner connected with the part H' of the aforesaid dog-carrying lever by another little center pin. The fast dog H$^3$ is also connected by a center pin or pin-joint with a bridle-lever H$^5$, lying substantially parallel with the dog-carrying lever. A lever I, pivoted upon a fulcrum-rod I', (said rod I' being set in a casting I$^3$, screwed fast to the lower surface of the rail A',) lies with its rear end under the lower end of the fast dog H$^3$ and with its front end under the extension $p^4$ of the arm $p^2$, so that whenever said arm $p^2$ is moved by the action of any of the right-hand keys upon the part P' the extension $p^4$ presses down the front end of the lever I, raising the rear end of said lever and raising the dog H$^3$. Another lever I$^2$, similar to the lever I, before mentioned, and fulcrumed upon the same pivot I', lies with its rear end under the lower end of the link H$^8$ and with its front end under the arm K$^2$ of the rock-shaft K', so that whenever said arm K$^2$ is moved by the action of the leftmost key $q^6$ upon the arm K of the rock-shaft K' the arm K$^2$ presses down the front end of the lever I$^2$, raising the rear end of said lever and raising the link H$^8$. Said link is connected by center pins or pin-joints with parallel levers H$^9$ and H$^{22}$. A lever H$^{23}$ lies above the dog-carrying lever, and said lever H$^{23}$ is connected with the dog-carrying lever by means of a link H$^{24}$, said link being pin-jointed to the parts H' and H$^{23}$, respectively. The levers H, H$^5$, H$^9$, H$^{22}$, and H$^{23}$, respectively, are provided with centers or trunnions marked, respectively, H$^{25}$, H$^{26}$, H$^{27}$, H$^{28}$, and H$^{29}$, and each of these trunnions is supported by center screws H$^{32}$ H$^{32}$, said screws being provided with check-nuts for adjustment. Adjustable stops H$^{33}$, H$^{34}$, and H$^{35}$, respectively, are attached to the levers H$^5$, H$^9$, and H$^{23}$, respectively, by machine-screws. To admit of adjustment the holes in the stops H$^{33}$, H$^{34}$, and H$^{35}$, through which the machine-screws last mentioned pass, are made elongated or elliptical, and washers are interposed between the heads of such screws and the stops H$^{33}$, H$^{34}$, and H$^{35}$. The loose dog H$^4$ is arrested by and rests against the stop H$^{35}$ when the rack $b^{72}$ rests against said dog. When said dog H$^4$ is free from the rack, said dog is arrested by the stop H$^{34}$; but if the link H$^8$ is elevated and the stop H$^{34}$ moved down thereby then the loose dog H$^4$ moves on under the influence of the spring H$^{36}$ until it (said dog) is arrested by the stop H$^{33}$. Normally the various parts occupy substantially the positions in which they are shown in Fig. 19. The rack rests in contact with the loose dog H$^4$, whose point is well up into the pitch of the rack. The fast dog H$^3$ lies with its point below a line tangent to the teeth of the rack $b^{72}$ a less distance than the point of the loose dog H$^4$ is above such a line. The keys $e$, $e'$, $e^2$, $e^3$, E$^4$, $e^4$, E$^5$, $e^5$, E$^6$, and $e^6$, as we have already seen, when depressed act upon the frame $p'$, which in turn moves the arm $p^2$ and hammer $p$, throwing the latter in toward the printing-point in the manner already described, and at the same time the projection $p^4$ of the arm $p^2$ depresses the front end of the lever I, raising the rear end of said lever, elevating the fast dog $H^3$ and tilting the dog-carrying lever, thus drawing the loose dog $H^4$ down out of the rack $b^{72}$ and pressing the fast dog $H^3$ up into it. The points of the dogs $H^3$ and $H^4$ stand, when the loose dog $H^4$ is pressed by the rack $b^{72}$ against the stop $H^{35}$, a certain number of rack-tooth spaces and a small fraction of a rack-tooth space apart, so that when the loose dog $H^4$ moves down away from the rack $b^{72}$ said rack moves a short distance in the direction of the arrow under the influence of the motor-spring arrangement hereinafter described until one of the teeth of said rack $b^{72}$ comes in contact with the fast dog $H^3$, whereby the rack and carriage connected therewith are thereupon arrested. Meantime the loose dog $H^4$ moves on under the influence of the contractile spring $H^{36}$ until said dog $H^4$ is arrested by the stop $H^{34}$, when the point of the dog $H^4$ stands not quite one rack-tooth space to the left of its former position in close proximity to the rack-tooth next to the left of the tooth with which it was last in contact. As the keys are released and return to their normal positions the fast dog $h^3$ moves down out of the rack and at the same time the loose dog $H^4$ moves up into it, and as soon as the fast dog $H^3$ clears the rack said rack moves in the direction of the arrow under the influence of the motor-spring hereinafter described until it is arrested by the loose dog $H^4$, which is pressed by the rack $b^{72}$ against the stop $H^{35}$.

It remains to describe the space-keys $q$ and $q^6$. The space-key $q$ is intended to make a single letter-space. When depressed, its front end depresses the arm $K^3$ of the rock-shaft $K^4$, which is fulcrumed between centers, as shown, and provided with a curved arm $K^5$, which lies over the front end of the lever I, moving it downward in the same manner that the lever I is moved downward by the projection $p^4$ of the arm $p^2$, thus producing a single letter-space in the manner already described. The key $q^6$ is arranged to make two spaces and is intended to be used principally in making the space at the end of a word simultaneously with the last letter thereof, the letter being made by the right hand and the space by the left. Said key $q^6$, when depressed, acts upon the arm K of the rock-shaft K′, which is centered between points, as shown, rocking said shaft and depressing its curved arm $K^2$, which acts upon the lever $I^2$, depressing the front end of said lever, raising the rear end thereof, elevating the link $H^8$, and rocking the levers $H^9$ and $H^{22}$. The lever $H^9$, when thus moved, comes in contact with the pin $H^{37}$, set in the fast dog $H^3$, and so raises said dog $H^3$, moving the dog-carrying lever and the loose dog $H^4$ and causing the parts to operate in the manner just described. The lever $H^9$, when thus moved by the key $q^6$, also serves to throw the end of the stop $H^{34}$ down below the end of the loose dog $H^4$, so that said loose dog, when it is moved by the contractile spring $H^{36}$, after its (said loose dog's) point has been moved down below the teeth of the rack, moves on until it is arrested by the stop $H^{33}$, and as the stop $H^{34}$ is so adjusted that when the loose dog is arrested by it the point of said loose dog lies very nearly one rack-tooth space to the left of its normal position, so, in like manner, the stop $H^{35}$ is adjusted in such a position that when the loose dog is arrested by it the point of said loose dog lies very nearly two rack-tooth spaces to the left of its normal position, so that when the dog-carrying lever returns to its normal position the carriage moves two rack-tooth spaces to the right as viewed from behind. Thus, it will be seen, the depressing of any of the printing-keys or of the space-key $q$ causes the carriage to move one letter-space, while the depressing of the double-space key $q^6$ causes it to move two letter-spaces, so providing room for a letter and an interverbal space. Thus the space at the end of a word is made simultaneously with the final letter thereof.

*Remarks as to the type-form-positioning mechanism.*—The type-form-positioning mechanism figured in the drawings is of the genus movement-synthesizer described in the specification of the before-mentioned Letters Patent of the United States No. 502,700, to which specification reference is hereby had and made for a fuller description of what I mean by "movement-synthesizer" mechanism and of the proper mode of constructing and arranging the same; but I shall endeavor to state briefly in this place a few facts in connection with the movement-synthesizer mechanism which should be borne in mind in constructing the machine.

First. The pairs of arms and links $f'$ and $g'$, $f^2$ and $g^2$, $f^4$ and $g^4$, $m'$ and $n'$, $m^2$ and $n^2$, and $m^4$ and $n^4$ should be arranged in such a manner that when in their normal positions each of said arms lies parallel or in line with the link with which it is connected, so that the movement-synthesizer is locked against thrusts and strains and lost motion prevented, as described more at length in the specification of the before-mentioned Letters Patent, No. 502,700, so that no movement of the type-form can take place, either vertically or laterally, unless there is a corresponding movement of some of the before-mentioned movement-synthesizer elements by which it is controlled. The rock-shaft arms $f'$ $f^2$ $f^4$, &c., may be made to occupy, normally, the position mentioned of parallelism or alinement with their respective links $g'$ $g^2$ $g^4$, &c., by adjusting the length of the various reach-ups $k'$ $k^2$ $k^4$, &c., so that when the key is in its normal position and the reach-up resting down upon it the rock-arm will occupy a position of alinement or parallelism with its link. A suitably-arranged spring may of course be used to assist the weight of the reach-up in holding the parts in their normal positions.

Second. All the parts of the mechanism should be arranged in such a manner that each particular key when depressed moves on until its motion is arrested by the rock-lever which it operates, as $f'\ f^2\ f^4$, or the rock-shaft arm, as $m'\ m^2\ m^4$, coming in contact with the adjustable stop $A^{262}$, against which the key must press it firmly in order that the parts may be locked and held against any thrusts or strains resulting from the operation of other parts of the movement-synthesizer or from the moving or arresting of the type-form, as more fully described in the specification of the before-mentioned Letters Patent No. 502,700. Very little care or adjustment is necessary for this purpose in connection with those keys which move but one rock-lever or rock-shaft, (such as $e\ e^4\ e^5\ e^6\ E^6$,) but more care is required in connection with those which (like $e'\ E^4\ E^5$) move two rock-levers or rock-shafts simultaneously, to insure that each of the rock-arms shall be forced firmly against its stop. To this end the lengths of the two reach-ups controlled by the same key must be very carefully adjusted to suit the position of their respective stops, so that the same key will force each of the two rock-arms firmly against its appropriate stop, and to this end a reach-up formed in two parts, as in the detail Fig. 33, adjustable upon each other by means of screws, as shown, so that the length of the reach-up may be increased or diminished, as required, for adjustment, may be used as the reach-up peculiar, say, to the keys $e\ E^4\ E^5$, or the same effect may be produced by the adjustment of the different arms of the rock-lever or rock-shaft or by cutting the keys at the points at which they act upon the reach-ups. Still another mode is illustrated in the detail Fig. 34, in which a little lever $E^{22}$ is fulcrumed on the key and made to act at one end, say, on the reach-up $k'$ and at the other end on the reach-up $k^4$, thus insuring the pressing of each of the two rock-arms controlled by the key firmly against its own stop.

Third. It is to be borne in mind that the movement of the type-form effected by a plurality of the movement-synthesizer elements acting simultaneously for the positioning of the type-form in the same arc or plane, while nearly equal, is not in fact exactly equal (measured in inches or millimeters) to the algebraic sum of the movements produced by those elements acting singly, all which is explained more at length in the specification of the before-mentioned Letters Patent, No 502,700, on pages 16 and 17 of said specification. In consequence the various parallel rows of type should not be placed exactly the same distance apart, measured in inches or millimeters. The true rule is to ascertain the exact position to which the type-form is moved by each key and combination of keys and then to place the row of type corresponding to such key or combination of keys upon that portion of the type-form which is brought in front of the printing-point by such key or combination of keys. To illustrate with reference to the drawings the course to be pursued in arranging the type upon a pattern type-form, the stop for the arm $m'$ should be so set that said arm when moved will raise the type-form exactly one letter-space, the stop for the arm $m^2$ should be so set that said arm $m^2$ will move the type-form downward two letter-spaces, and the stop for the arm $m^4$ should be so set that said arm $m^4$ will raise the type-form four letter-spaces. The type-form should now be marked when in its normal position and at a point immediately in front of the printing-point; it should then be moved downward one letter-space by the simultaneous action of the couples $m'\ n'$ and $m^2\ n^2$ and marked in that position; it should then be moved downward two letter-spaces by the action of the couples $m^2\ n^2$ and marked in that position; it should then be moved up one letter-space by the action of the couple $m'\ n'$ and marked in that position; it should next be moved upward two letter-spaces by the action of the couples $m^2\ n^2$ and $m^4\ n^4$ and marked in that position; then it should be moved upward three letter-spaces by the action of the couples $m'\ n'$, $m^2\ n^2$, and $m^4\ n^4$ and marked in that position, and, finally, it should be moved upward four letter-spaces by the action of the couple $m^4\ n^4$ and marked in that position. The rows of characters should be placed upon the levels of these marks. The rows will not be exactly equidistant, measured in inches or millimeters, but the alinement will be perfect. The magnitude of the letter-spaces will vary slightly, measured in inches, and the movement given to the type-form by a plurality of couples acting simultaneously will not be exactly equal, measured in inches, to the algebraic sum of the individual movements of such couples, but the movement given to the type-form, counted in letter-spaces or rows of type on the type-form, (which is the important point,) will always be exactly equal to the algebraic sum of the movements of the various couples acting and the alinement will be perfect. The distances between the various vertical rows should be determined in a like manner, the type-bars being made of different thicknesses or placed different distances apart, so that each type-bar will be brought correctly to the printing-point by the particular key or combination of keys that is designed to bring it there, as before described. When a perfect pattern type-form is once made in the manner described, it will only be necessary in adjusting machines thereafter to adjust the various simple elements of the movement-synthesizer, as $m'$, $m^2$, $m^4$, $f'$, $f^2$, and $f^4$. The combinations will always come right when the simple elements are rightly adjusted if the type-form be made exactly like the pattern type-form.

*The arrangement of the characters upon the type-form in curves.*—It will be observed that the rows of characters upon the type-form are not arranged in straight lines, but in curves. It will be observed also that the movement of the type-form for positioning the characters is not in straight lines, but in curves. The arrangement of the rows of characters in curves is to justify or compensate the curving movement of the type-form. Thus it will be observed that when the type-form moves laterally from right to left, or vice versa, it moves in an arc the length of whose radius is the length of the levers $d^{29}$ $d^{29}$ between centers, and it will be seen that the curves in which the various horizontal rows of characters are arranged are the reverse of the curve described by the motion of the type-form carried by the aforesaid guide-levers, so that each character is made to stand at the exact level of the printing-point when brought in front of the printing-point. It will be observed also that when the type-form moves vertically its connection with the link $h^9$ causes it to move in a curve whose radius is the same as the link $h^9$, and it will be seen that the curves in which the vertical rows of characters are arranged are curves the reverse of the curve described by the type-form when moving up and down under the restraining influence of the link $h^9$, so that each character in the same vertical row stands in exactly the correct right and left position in front of the printing-point when moved to the level of the printing-point. In brief, the purpose of arranging the characters in curved rows upon the type-form is to compensate for the curving motion of the type-form. The curves must therefore be described upon a radius of the same length as the radius in which the type-form moves for positioning the row curved, and the curve of each row of type must be made opposite to the curve described by the type-form in positioning such row—that is to say, as the line of lateral movement of the type-form curves downward the horizontal lines or rows of type must curve exactly the same distance upward, and vice versa, and as the type-form moving vertically curves, say, to the right the vertical rows of characters must curve just the same amount to the left, and vice versa, so that the curving movement of the type-form is perfectly compensated and each character brought to exactly the same printing-point.

I wish it to be very distinctly understood that the ribbon mechanism, the spacing mechanism, and the carriage-motor mechanism herein described are not new and form no part of this invention; that they have been shown and described herein only for the purpose of illustrating a complete machine; that no importance whatever is attached to them, and that other arrangements for inking the type, making the spaces, and impelling the carriage might be substituted for them. I wish it to be understood also that while certain portions of the carriage mechanism shown herein—to wit, the arrangement of parts for mounting the carriage—are believed to be new they are not claimed herein, (being claimed in the before-mentioned prior application, Serial No. 511,633, filed May 18, 1894,) and are nowise essential to the present invention, and that other suitable arrangements may be substituted for them. I wish it to be understood also that the movement-synthesizer mechanism illustrated herein is illustrated as one suitable means of positioning the type-form; that it is not considered indispensable; that I do not confine myself to it, and that others of the very numerous kinds of type-form-positioning mechanism patented and otherwise known in the art might doubtless be substituted for it. My present application, as stated at the commencement of this specification, relates to the improved type-form herein described. That improvement is the gist of my present invention, and everything else shown in the drawings and described in this specification is merely collateral to it, such collateral things being illustrated and described only in order that the mechanic may be enabled to construct an operative machine from the information herein contained and without having to refer elsewhere.

The arrangement of type-form described, it will be observed, has the merit of being easily constructed of tempered steel bars, so that the type will wear indefinitely. It will also be seen that the bars are independent in their in-and-out motion for printing, so that only a fraction of the type-form—a single bar—is moved to and from the printing-point when the character is printed, and as the bars are independent they may be placed very close together and the lateral movement of the type-form for positioning the characters reduced to a minium.

Various modifications may be made without departing from the essentials of my invention, which are set forth in the statement of claim immediately following.

What I claim as my invention, and desire to secure by Letters Patent, is—

1. In a type-writer or other similar machine, and in combination, a plurality of keys; a type-form including a plurality of type-bars each furnished with a plurality of characters, and means for mounting the type-form for the positioning of the characters including a pair of substantially parallel levers of equal or nearly equal length, each having its free end connected in a suitable manner with the type-form; and movement-synthesizer mechanism intermediate the keys and the type-form serving to position the part last named.

2. In a type-writer or other similar machine, and in combination, a plurality of keys; a type-form including a plurality of type-bars each furnished with a plurality of characters, and means for mounting the type-form for the positioning of the characters including (a) a lever, (b) a part carried thereby, and (c) another lever centered upon the part last above mentioned as being carried by the first lever, the type-form being carried by the second lever; one of the levers mentioned serving to afford facility for movement of the type-form in one arc or plane for the positioning of its various characters in that arc or plane; the other lever serving to afford facility for movement of the type-form in another arc or plane transverse to the first, for the positioning of the characters in such arc or plane; and type-form-positioning mechanism intermediate the keys and the type-form, including one or more movement-synthesizers.

3. In a type-writer or other similar machine, and in combination, a plurality of keys; a type-form including a plurality of type-bars, each furnished with a plurality of characters and means for mounting the type-form for the positioning of the characters, including (a) a pair of substantially parallel levers, of equal or nearly equal length; (b) a part connected with the free ends of said levers and carried thereby; and (c) a second pair of substantially parallel levers of equal or nearly equal length, mounted upon the part before mentioned as being carried by the first levers, and connected at their free ends with the type-form; the pair of levers first mentioned serving to afford facility for movement of the type-form in one arc or plane for the positioning of the characters in such arc or plane; the second pair of levers serving to afford facility for movement of the type-form in another arc or plane transverse to the first, for the positioning of the characters in such transverse arc or plane; and type-form-positioning mechanism intermediate the keys and the type-form, including one or more movement-synthesizers.

4. In a type-writer or other similar machine, and in combination, a plurality of keys; a type-form including a plurality of type-bars furnished each with a plurality of characters, said type-form being mounted for movement in two different arcs or planes (a) to bring the different type-bars to the printing-point, and (b) to bring the different characters on the type-bars to the printing-point; type-form-positioning mechanism intermediate the keys and the type-form, whereby the various characters are brought to position for printing, opposite the printing-point, said type-form-positioning mechanism including one or more movement-synthesizers; and a key-controlled impression-hammer, arranged to impel the particular type-bar brought to the printing-point against the printing-point.

In testimony whereof I have hereunto set my hand, at Washington, in the District of Columbia, this 30th day of July, A. D. 1894, in the presence of the subscribing witnesses, whose names are hereto annexed.

THADDEUS CAHILL.

Attest:
ARTHUR T. CAHILL,
M. H. CAHILL.